United States Patent
Ha et al.

(10) Patent No.: US 7,099,273 B2
(45) Date of Patent: Aug. 29, 2006

(54) DATA TRANSPORT ACCELERATION AND MANAGEMENT WITHIN A NETWORK COMMUNICATION SYSTEM

(75) Inventors: Sungwon Ha, San Jose, CA (US); Sung-wook Han, San Jose, CA (US); Tae-eun Kim, Sunnyvale, CA (US); Vaduvur Bharghavan, San Jose, CA (US); Upamanyu Madhow, Santa Barbara, CA (US); Kannan Ramchandran, Berkeley, CA (US)

(73) Assignee: Bytemobile, Inc., Mountain View, CA (US)

( * ) Notice: Subject to any disclaimer, the term of this patent is extended or adjusted under 35 U.S.C. 154(b) by 1021 days.

(21) Appl. No.: 10/061,574

(22) Filed: Jan. 29, 2002

(65) Prior Publication Data

US 2002/0150048 A1    Oct. 17, 2002

Related U.S. Application Data

(60) Provisional application No. 60/309,212, filed on Jul. 31, 2001, provisional application No. 60/283,542, filed on Apr. 12, 2001.

(51) Int. Cl.
*H04J 1/16* (2006.01)
*H04J 3/14* (2006.01)

(52) U.S. Cl. .................. 370/229; 370/235; 370/236

(58) Field of Classification Search ............... 370/229, 370/230, 230.1, 231, 232, 235, 235.1, 236, 370/252; 709/235
See application file for complete search history.

(56) References Cited

U.S. PATENT DOCUMENTS 6,038,216 A    3/2000    Packer ..................... 370/231

(Continued)

FOREIGN PATENT DOCUMENTS

EP    0 415 843 A2    3/1991

(Continued)

OTHER PUBLICATIONS

M. Allman, "TCP Congestion Control", IETF FRC, Online! Apr. 1999 XP 002210779, pp. 1-12.

(Continued)

*Primary Examiner*—Ajit Patel
(74) *Attorney, Agent, or Firm*—Wilson Sonsini Goodrich & Rosati

(57) ABSTRACT

Improved data transport and management within a network communication system may be achieved by utilizing a transmit timer incorporated within the sender device and exploiting host-level statistics for a plurality of connections between a sender and receiver. The period of the transmit timer may be periodically adjusted based on a ratio of the smoothed round-trip time and the smoothed congestion window, thereby reducing or eliminating bursty data transmission commonly associated with conventional TCP architectures. For applications having a plurality of connections between a sender and a receiver that share a common channel, such as web applications, the congestion window and smoothed round trip time estimates for all active connections may be used to initialize new connections and allocate bandwidth among existing connections. This aspect of the present invention may reduce the destructive interference that may occur as different connections compete with one another to maximize the bandwidth of each connection without regard to other connections serving the same application. Error recovery may also be improved by incorporating a short timer and a long timer that are configured to reduce the size of the congestion window and the corresponding transmission rate in response to a second packet loss with a predefined time period in order to increase resilience to random packet loss.

15 Claims, 14 Drawing Sheets

U.S. PATENT DOCUMENTS

| | | | | |
|---|---|---|---|---|
| 6,076,114 | A | 6/2000 | Wesley | 709/235 |
| 6,105,064 | A | 8/2000 | Davis et al. | 709/224 |
| 2001/0032269 | A1* | 10/2001 | Wilson | 709/235 |
| 2002/0071388 | A1* | 6/2002 | Bergsson et al. | 370/230 |
| 2002/0085587 | A1* | 7/2002 | Mascolo | 370/477 |
| 2002/0154602 | A1* | 10/2002 | Garcia-Luna-Aceves et al. | 370/230 |
| 2006/0050638 | A1* | 3/2006 | Meyer et al. | 370/231 |

FOREIGN PATENT DOCUMENTS

| | | |
|---|---|---|
| WO | WO 97/35410 | 9/1997 |
| WO | WO 00/04665 | 1/2000 |
| WO | WO 00/51296 | 8/2000 |

OTHER PUBLICATIONS

Andras Veres, "The Chaotic Nature of TCP Congestion Control", Proceedings IEEE Infocom 2000, vol. 3 of 3, conf. 19, XP-001044268, pp. 1715-1723.

W. Richard Stevens, "TCP Time Out and Retransmission", TCP/IP Illustrated, vol. 1, The Protocols, 2000, Computing Series XP002223116, pp. 297-337.

Upkar Varshney, "Selective Slow Start: A Simple Algorithm For Improving TCP Performance in Wireless ATM Environment," IEEE, Nov. 1997, vol. 1, XP-000799722, pp. 465-469.

J. Touch, "TCP Control Block Interpendence," Apr. 1997, IETF XP-002223117, pp. 1-11.

Robert Morris, "TCP Behavior With Many Flows," IEEE Conference on Network Protocols, Oct. 1997, XP-002223115, pp. 205-211.

Hari Balakrishnan, "TCP Behavior of a Busy Internet Server: Analysis and Improvements," InFocom 1998, pp. 252-262.

Shih-Chiang Tsao, "Pre-Order Deficit Round Robin: a new scheduling algorithm for packet-switched networks," Computer Networks, vol. 35, No. 2-3, Feb. 2001, pp. 287-305.

Prashant Pradhan, "Aggregate TCP Congestion Control Using Multiple Network Probing," IEEE, 2000, pp. 30-37.

* cited by examiner

DATA TRANSPORT ACCELERATION AND MANAGEMENT WITHIN A NETWORK COMMUNICATION SYSTEM

REFERENCE TO RELATED APPLICATIONS

The present application claims priority from U.S. provisional application Nos. 60/309,212 and 60/283,542 filed Jul. 31, 2001 and Apr. 12, 2001, respectively. U.S. provisional application Nos. 60/309,212 212 and 60/283,542 are hereby incorporated herein by reference in their entirety.

BACKGROUND

1. Field of Invention

The present invention generally relates to data communication protocols, and more particularly, to systems and methods for data transport acceleration and management within a network communication system.

2. Description of Related Art

Transport Control Protocol (TCP) has become a common end-to-end data transport protocol used in modern data communication networks. Communication networks employing a TCP architecture offer significant advantages in terms of connectivity by enabling applications and users deployed on different physical networks to communicate with one another using a common communications protocol. The recent increase in the number and diversity of applications, users and networking environments utilizing TCP architectures, however, has exposed many of the limitations associated with a single, ubiquitous design. Because these architectures were primarily intended to provide reliable, sequenced transmission of non-real-time data streams over relatively high bandwidth wireline channels, these TCP architectures tend to exhibit sub-optimal performance when employed in applications or networking environments having different or incompatible characteristics.

Many of the problems associated with conventional TCP architectures stem from the flow control, congestion control and error recovery mechanisms used to control transmission of data over a communication network. Typical TCP flow control mechanisms, for example, utilize an acknowledgement-based approach to control the number and timing of new packets transmitted over the communication network. In these implementations, a sender maintains a congestion window parameter that specifies the maximum number of unacknowledged packets that may be transmitted to the receiver. As the sender receives acknowledgement signals from the receiver, the congestion control mechanism increases the size of the congestion window (and decreases the number of unacknowledged packets), thereby enabling the flow control mechanism to immediately transmit additional packets to the receiver. The problem with this approach is that it assumes that the network employs symmetric communication channels that enable data packets and acknowledgements to be equally spaced in time. In communication networks, such as wireless communication networks, that employ asymmetric uplink and downlink channels, where the available bandwidth towards the receiver is significantly higher than the available bandwidth towards the sender, the receiver may be unable to access the uplink channel in order to transmit acknowledgement signals to the sender in a timely manner. This initial delay in the transmission of acknowledgement signals may cause the sender to suspend transmission of additional data packets until additional acknowledgement signals are received, and then transmit a large burst of packets in response to the sender receiving a large group of acknowledgement signals. This bursty nature of data transmission may under-utilize the available bandwidth on the downlink channel, and may cause some applications requiring a steady flow of data, such as audio or video, to experience unusually poor performance.

The congestion control and error recovery mechanisms typically employed in TCP architectures may also cause the communication network to exhibit sub-optimal performance. In conventional TCP implementations, the congestion control and error recovery mechanisms are used to adjust the size of the congestion window (and therefore the number of new packets that may be transmitted to the receiver) based on the current state of the congestion control and error recovery algorithm. In the initial "slow start" state, for example, the sender rapidly probes for bandwidth by increasing the size of the congestion window by one for each new acknowledgement received from the receiver until the congestion window exceeds a particular congestion window threshold. Once the congestion window exceeds the congestion window threshold, the algorithm enters a "congestion avoidance" state, where the congestion window is increased by one whenever a number of acknowledgment signals equal to the size of the current congestion window is received. If the sender receives a predetermined number of duplicate acknowledgements or a selective acknowledgment ("SACK") that indicate that a packet in the sequence has not been received, the algorithm enters a "fast retransmit" state in which the sender decreases the congestion window to a size equal to one half of the current congestion window plus three, and retransmits the lost packet. After the "fast retransmit" state, the algorithm enters a temporary "fast recovery" state that increments the congestion window by one for each duplicate acknowledgement received from the receiver. If an acknowledgement for the lost packet is received before a retransmit timeout occurs (which is typically based on the average and mean deviation of round-trip time samples), the algorithm transitions to the "congestion avoidance" state. On the other hand, if an acknowledgement for the lost packet is not received before a retransmit timeout occurs, the sender resets the congestion window to one, retransmits the lost packet and transitions to the "slow start" state.

The problem with the foregoing approach is that the congestion avoidance and error recovery mechanisms assumes that packet loss within the communication network was caused by congestion, rather than a temporary degradation in the signal quality of the communication channel. Although this assumption may work adequately for many wireline communication networks that have a relatively low occurrence of random packet loss, random packet loss due to fading, temporary degradation in signal quality, signal handoffs or large propagation delays occur with relatively high frequency in most wireless and other bandwidth constrained networks. Because conventional TCP architectures react to both random loss and network congestion by significantly and repeatedly reducing the congestion window, high levels of random packet loss may lead to significant and potentially unjustified deterioration in data throughput. TCP performance, particularly in the fast recovery state, may also be adversely impacted by signal handoffs and fades that typically occur in wireless networks. Handoffs and fades can cause multiple data packet losses, which can lead to failure of TCP's fast recovery mechanism and result in prolonged timeouts. If the handoff or fade lasts for several round trip times, failure of multiple retransmission attempts may cause exponential backoff of data throughput. This may result in long recovery times that last significantly longer than the originating fades or handoffs, and may cause TCP connections to stall for extended periods of time.

Another area where conventional TCP congestion control mechanisms tend to exhibit sub-optimal performance is initialization of data connections over reduced-bandwidth channels, such as wireless links. Generally, when a connection is initiated, the congestion control mechanism aggressively increases the size of the congestion window until it senses a data packet loss. This process may adversely impact other connections that share the same reduced-bandwidth channel as the connection being initialized attempts to maximize its data throughput without regard of the other pre-existing connections. For example, many applications, such as web browsers, often open multiple TCP connections between a given sender and a given receiver. Under conventional TCP architectures, these connections operate independently and may compete with one another for the same bandwidth, even though they serve the same application. This may lead to inefficient use of resources with decreased overall throughput as connections initialized at later times disrupt connections already in progress.

Therefore, in light of the deficiencies of existing approaches, there is a need for improved systems and methods for data transport acceleration and management within a network communication system, particularly network communication systems having wireless and other bandwidth constrained channels.

SUMMARY OF THE INVENTION

Embodiments of the present invention provide systems and method for data transport acceleration and management within a network communication system. In one embodiment of the present invention, a transmit timer incorporated within the sender is utilized to provide timer-based data flow control, instead of the acknowledgement-based flow control utilized in conventional TCP architectures. The transmit time may be used by the sender to determine the rate at which data packets are transmitted to the receiver. The period of the transmit timer may be based on smoothed round trip time and smoothed congestion window measurements to provide a better estimate of available bandwidth. For example, in one embodiment, the period of the timer may be determined by the ratio of the smoothed round trip time and the smoothed congestion window and may be periodically updated to reflect the current state of the communication channel. This timer-based approach to flow control, together with the smoothing used to compute the transmission rate, offers a more relevant estimate of congestion within the communication network and may reduce or eliminate the bursty transmission of data commonly associated with conventional TCP architectures.

According to another embodiment of the present invention, a short timer may be used to enable faster error recovery if the duplicate acknowledgment or selective acknowledgment mechanisms for loss detection provided by typical TCP implementations fail. For example, the short timer may be used to provide a dial tone that maintains a connection active for a predetermined period of time during traffic congestion while the network is probed to detect whether transmission conditions improve. The exponential backoff of the timeout timer that causes stalls in conventional TCP implementations may also be disabled, and a long timer may be used in conjunction with the short timer to provide a more robust response to random packet loss. For example, the short timer and the long timer may be set in response to detection of a lost packet. Expiration of the short timer may be configured to cause the sender to retransmit the lost packet. If the long timer expires before an acknowledgement for the retransmitted packet is received, the sender may then reduce the congestion window (and the corresponding transmission rate) and transition to a slow start state. The exponential backoff of the timeout timer may also be delayed by, for example, disabling the exponential backoff for a predetermined number of expirations of the long timer, thereby reducing stalls due to transient phenomenon and protecting against the possibility of network congestion collapse. These approaches may significantly reduce the vulnerability to random packet loss by causing the sender to reduce the congestion window in response to a second packet loss within a predetermined time period, instead of the first packet loss as used in conventional TCP implementations.

Another embodiment of the present invention provides for early detection of network traffic congestion by comparing a current smoothed estimate of the round trip time with a previous value of the smoothed estimate of the round trip time, such as the value of the smoothed estimate of the round trip time substantially one round-trip time earlier. If the change in the smoothed round trip time estimates exceeds a predetermined threshold, the size of the congestion window may reduced, which reduces the transmission rate of the transmit timer. If the change in the next smoothed round trip time estimates again exceeds the predetermined threshold, the congestion window may be reduced by a greater level than the initial reduction. By adjusting the congestion window based on the smoothed round trip time, the sender may be able to detect congestion within the network without causing a packet loss.

When a plurality of connections between a server and a client share a single communication channel, another embodiment manages access to the shared channel by each connection based on a set of weights corresponding to the plurality of connections and on host-level statistics. For example, a comparison between a then-current smoothed estimate of a round trip time for a particular connection and a minimum value of the smoothed estimate of the round trip time for the plurality of other connections may be used to adjust the rate of change of the congestion window for that particular connection in a slow start state. In another embodiment, the congestion window for a particular connection is updated during a congestion avoidance state based on a four-state model that employs host-level statistics. The statistics may include a congestion window for that particular connection, a smoothed estimate of the round trip time for that particular connection, or a change in the sum of the congestion windows for a plurality of connections. The available bandwidth among the active connections may then be allocated based on a set of host-level variables, including a sum of the congestion windows of the individual connections and a minimum value of the smoothed estimate of the round trip time for all connections.

According to another embodiment of the invention, a TCP communication session transitions from a slow start state to a congestion avoidance state based on a comparison between a then-current smoothed estimate of the round trip time and a minimum value of the smoothed estimate of the round trip time recorded over a prior period of time. In a particular embodiment, if multiple connections share a single communication channel, the minimum value of the smoothed estimate of the round trip time is determined over all the connections sharing the channel. The then-current smoothed estimate of the round trip time may then be compared to the minimum value of the smoothed estimate of the round trip time recorded over a prior period of time to determine whether to switch from increasing the congestion window at a relatively-fast rate in a slow start state to increasing the congestion window at a more gradual rate in congestion avoidance.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION

Aspects of the present invention provide systems and methods for data transport acceleration and management within a communications network. Either alone or in combination, these systems and methods provide improved data transfer between devices connected via communication networks, including wireless and wireline networks. The following description is presented to enable a person skilled in the art to make and use the invention. Descriptions of specific embodiments or applications are provided only as examples. Various modifications, substitutions, and variations of embodiments will be apparent to those skilled in the art, and the generic principles defined herein may be applied to other embodiments and applications without departing from the spirit and scope of the invention. The present invention should therefore not be limited to the described or illustrated embodiments, and should be accorded the widest scope consistent with the principles and features disclosed herein.

Figure 1:
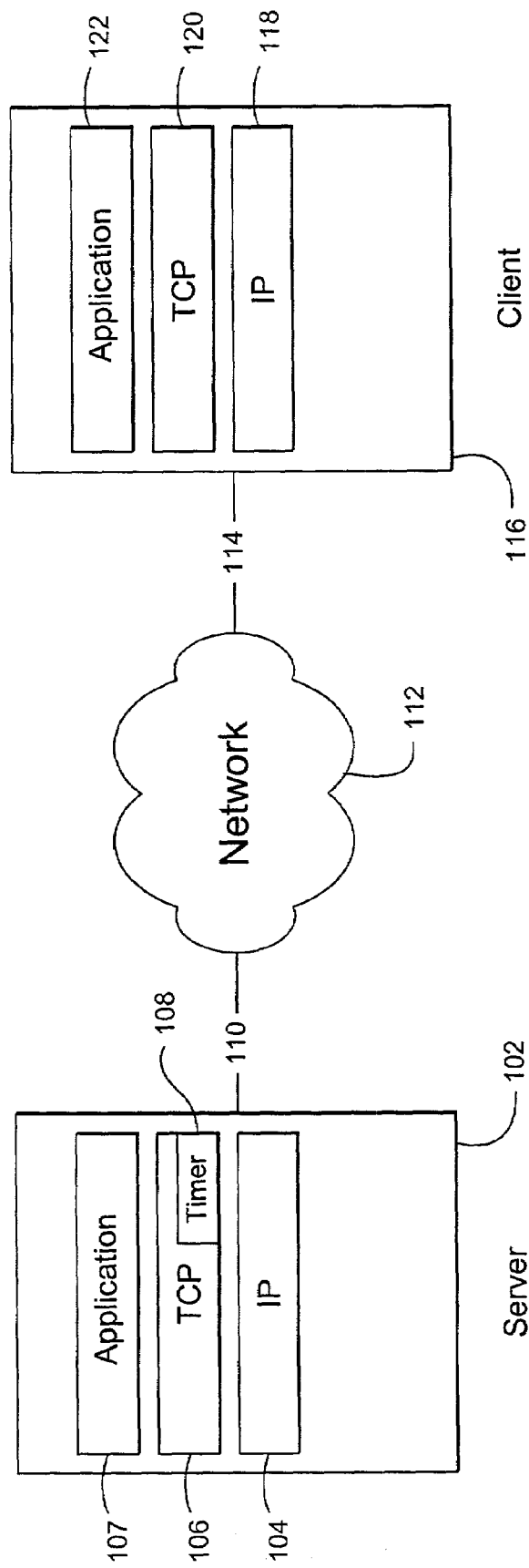
FIG. 1 illustrates an exemplary network communication system in which certain aspects of the present invention may be advantageously practiced.

FIG. 1 illustrates an exemplary network communication system in which certain aspects of the present invention may be advantageously practiced. The exemplary system includes a server 102 that communicates with a client 116 via a network 112, such as the Internet, General Packet Radio Service (GPRS) or other wireline or wireless network. The server 102 and the client 116 may each comprise a computing device, such as a computer, mobile computer, laptop computer, wireless device, personal digital assistant, or cellular telephone, that are configured to transmit and receive data in accordance with a data communication protocol. As such, the terms "server" and "sender" generally represent a computing device that transmits data, and the terms "client" and "receiver" generally denote a computing device that receives data. Of course, the functions of the server 102 and the client 116 may be interchangeable depending on the direction of the data stream. For example, the server 102 could function as a client and the client 116 could function as a server in the event the server 102 receives a data stream from the client 116. Similarly, the server 102 and the client 116 may both act as a server and a client with respect to each other during the same communication session in the event the server 102 and the client 116 are performing duplex independent transmissions, such as when the server 102 is streaming multimedia data to the client 116 while the client 116 is transmitting an email message to the server 102. In other embodiments, additional servers and clients may exist and be interconnected via the network 112, and the server 102 may communicate with one or more additional clients.

As further illustrated in FIG. 1, the server 102 includes an IP layer 104, a TCP layer 106 and a server application 107. The IP layer 104 provides data-level support for communications between the server 102 and the client 116, including managing the format of the data packets and the addressing scheme. The TCP layer 106 provides connection-level support for communications between the server 102 and the client 116, including managing the establishment of connections and delivery of data from and to the server application 107. The IP layer 104 and the TCP layer 106 cooperate to provide virtual data connections between the server 102 and the client 116. The server application 107 may comprise one or more applications, such as a web application, video conferencing application or email application, that rely on the TCP layer 106 and the IP layer 104 to transmit and receive data. In a similar manner, the client 116 also includes a client IP layer 118, a client TCP layer 120 and a client application 122 that perform functions similar to the ones provided by the IP layer 104, the TCP layer 106 and the server application 107.

In operation, the server 102 and the client 116 communicate via the network 112 using data transmissions configured in accordance with the TCP protocol. In this context, the IP layer 104 and the TCP layer 106 of the server 102 may communicate with the client IP layer 118 and the client TCP layer 120 to establish one or more virtual connections between the server 102 and the client 116 via the network 112. These virtual connections may serve the server application 107 running on the server 102 and the client application 122 running on the client 116. For example, in one embodiment, the server 102 may transmit data requested by a web browser application running within the client application 122. Data transmitted by the server 102 to the client 116 is formatted into data packets by the IP layer 104 and the TCP layer 106 and addressed to the client 116 according to the Internet Protocol ("IP") scheme. The data packets formatted by the IP layer 104 and the TCP layer 106 are transmitted via the server channel 110 to the network 112. The network 112 then routes the data packets through the network 112 to the client 16 via the client channel 114. Once the client 116 receives the data packets, the client IP layer 118 and the client TCP layer 120 disassemble the incoming data packets, extract the appropriate information and transmit appropriate acknowledgement signals back to the server 102.

Conventional TCP implementations incorporated within network communications systems, such as the exemplary network communication system of FIG. 1, may experience sub-optimal performance depending on the application or networking environment. For example, because the flow control mechanism incorporated within conventional TCP implementations transmits new packets in response to each received acknowledgement (and the size of the congestion window), these flow control mechanisms may produce bursty data transmission in the event the networking environment utilizes asymmetric uplink and downlink channels that prevent the client from transmitting acknowledgement signals in a timely manner. Conventional TCP implementations may also erroneously assume that random packet loss that is common within wireless networking environments corresponds to congestion loss, rather than to a mere temporary degradation in the signal quality of the wireless channel. This erroneous detection of congestion loss may cause the server 102 to substantially reduce the size of the congestion window and the corresponding number of unacknowledged packets the server may transmit to the client. The error recovery mechanisms may also be susceptible to signal handoffs and deep fades in that the unacknowledged packets may cause an exponential increase in the retransmit timer and a corresponding decrease in the data throughput, which in many cases may represent overly aggressive responses to the actual problems. Furthermore, if multiple connections are established between the client and the server, the aggressive initialization typically employed within TCP implementation during slow start may cause new connections to substantially interfere in the existing connections.

Embodiments of the present invention alleviate many of the foregoing problems by enhancing the operation of TCP without severing end-to-end TCP syntax. For example, instead of the acknowledgement-based flow control typically implemented within TCP architectures, embodiments of the present invention utilize a transmit timer 108 that may be used to provide timer-based flow control of data transmitted by the server 102. In other words, instead of transmitting a specified number packets in response to receiving a specified number of acknowledgements, embodiments of the present invention transmit a packet in response to each expiration of the transmit timer 108. The period of the timer may be determined by the ratio of the smoothed round trip time and the smoothed congestion window and may be periodically updated as a predetermined number of new measurements are taken. This timer-based flow control and the smoothing used to compute the period of the transmit timer 108 may reduce bursty transmissions and provide a better measurement of network congestion. The transmission rate determined in accordance with this aspect of the invention may be applied to both new and retransmitted packets.

Another embodiment of the present invention reduces the adverse effects associated with random packet loss by resetting the congestion window in response to the second packet loss (rather than the first) to provide improved robustness to random packet loss. Additionally, the initialization criterion used to determine whether to transition from aggressive growth of the congestion window in slow start to less aggressive growth in congestion avoidance may be based on the smoothed round trip time (instead of the size of the congestion window) in order to provide a better estimation of network congestion. For multiple connections between the same client and the same server, the congestion windows and initialization criteria for all active connections may be linked together and allocated among the active connections so as to avoid destructive competition among existing connections. As a result, these aspects of the invention may provide significant improvements in performance over conventional TCP implementations.

Figure 2:
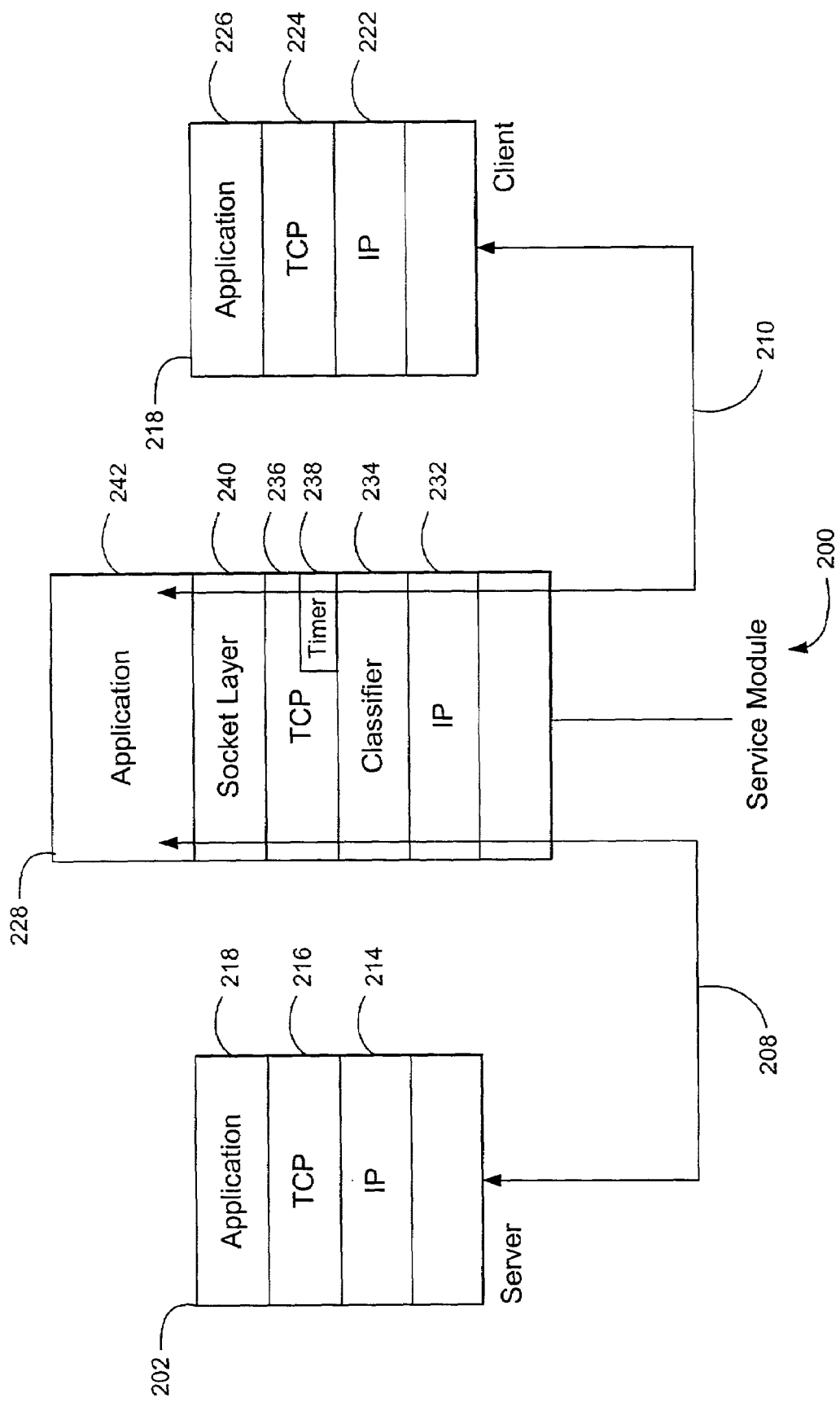
FIG. 2 illustrates another exemplary communication system in which certain aspects of the present invention may be advantageously practiced.

FIG. 2 illustrates another exemplary communication system in which certain aspects of the present invention may be advantageously practiced. In the exemplary system of FIG. 2, a service module 228 is deployed between a server 202 and a client 218 to manage TCP data transmissions. Unlike in the embodiment of FIG. 1, where TCP data transmissions are managed by a server, the embodiment of FIG. 2 utilizes the service module 228 to intercept and regulate data transmission between the server 208 and the client 218. For example, the service module 228 may include a classifier 234 that classifies packets communicated between the server 202 and the client 218 to determine whether the connection corresponds to a service application 242 supported by the service module 228. If so, the service module 228 breaks the connection between the server 202 and the client 218 to form a server side connection 208 between the service application 242 and the sever 202 and a client side connection 210 between the service application 242 and the client 218. Because this process forms two separate connections that pass through the TCP layer 236 and the IP layer 232 of the service module 228, embodiments of the present invention may be configured to provide transport acceleration and data management over both the server side connection 208 and the client side connection 210, thereby enhancing end-to-end performance.

Additional information regarding the functionality, features and operation of a service module deployed between a server and a client to manage TCP data transmissions as illustrated in FIG. 2 is described in U.S. patent application Ser. No. 10/095,551, entitled "Service-Based Compression of Content Within A Network Communication System" and in U.S. patent application Ser. No. 10/126,131, entitled "Systems and Methods for Providing Differentiated Services within a Network Communication System," which have been assigned of record to the assignee of the present application and are incorporated herein by reference.

Figure 3:
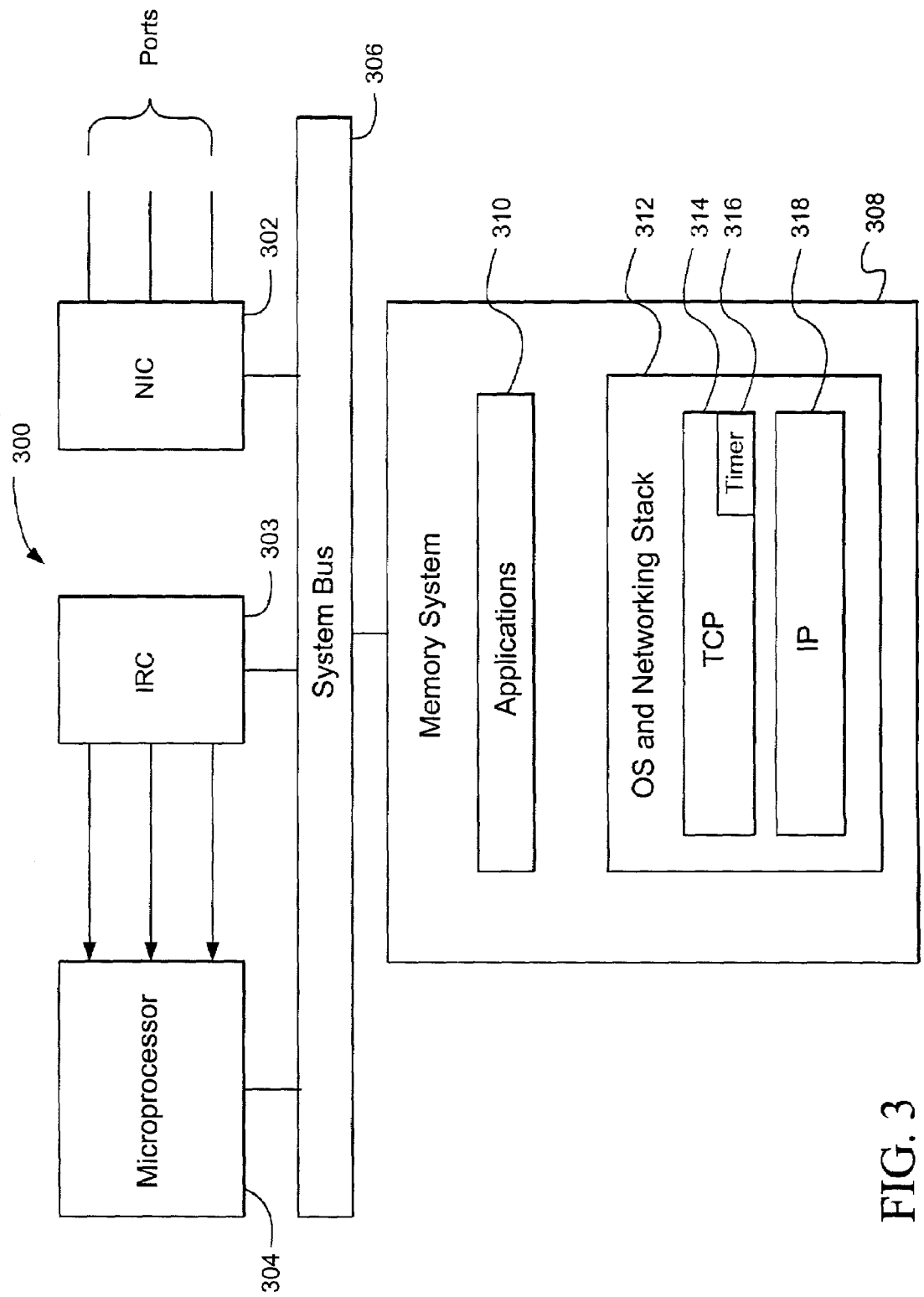
FIG. 3 illustrates an exemplary platform that may be used in accordance with the present invention.

Referring to FIG. 3, an exemplary platform that may be used in accordance with the present invention is illustrates generally at 300. As illustrated, the exemplary platform includes a network interface card 302, a microprocessor 304, a memory system 308 and an interrupt controller 310, which are all operationally coupled to a system bus 306. The network interface card 302 interfaces via one or more data ports with other systems or nodes of a communication network, such as a network router, gateway or base transceiver station. The interrupt controller 310 is coupled to the processor 304 via one or more communication lines. The memory system 308, which may comprise a random access memory, hard drive, floppy disk, compact disk, or another type of computer readable medium, stores various modules that control the functionality of the exemplary platform, such as applications 310 and an operating system and networking stack 312. The operating system and networking stack 312 comprises a TCP layer 314 and an IP layer 318. As will be discussed in greater detail below, the TCP layer 314 comprises a number of features that enhance TCP performance according to various aspects of the present invention, including a transmit timer 316 which controls the rate at which data packets are transmitted by the platform 300.

In operation, when the network interface card 302 receives a data packet, the network interface card 302 generates an interrupt command and communicates it to the interrupt controller 310. The interrupt controller 310 then passes the interrupt command to the processor 304 in accordance with the priority assigned to that particular interrupt. When the processor 304 receives the interrupt, the processor 304 executes one or more interrupt handlers incorporated within the operating system and networking stack 312 to process the incoming data packet. Embodiments of the present invention may also incorporate other functionalities within the operating system and networking stack 312, such as functionalities for classifying a connection, breaking a connection between a wireless client and a server and swapping source addresses for outgoing packets. In other embodiments of the present invention, the operating system and networking stack 312 may also interact with the applications 310 to provide various services, such as web browser applications, video conferencing or email applications.

Figure 4:
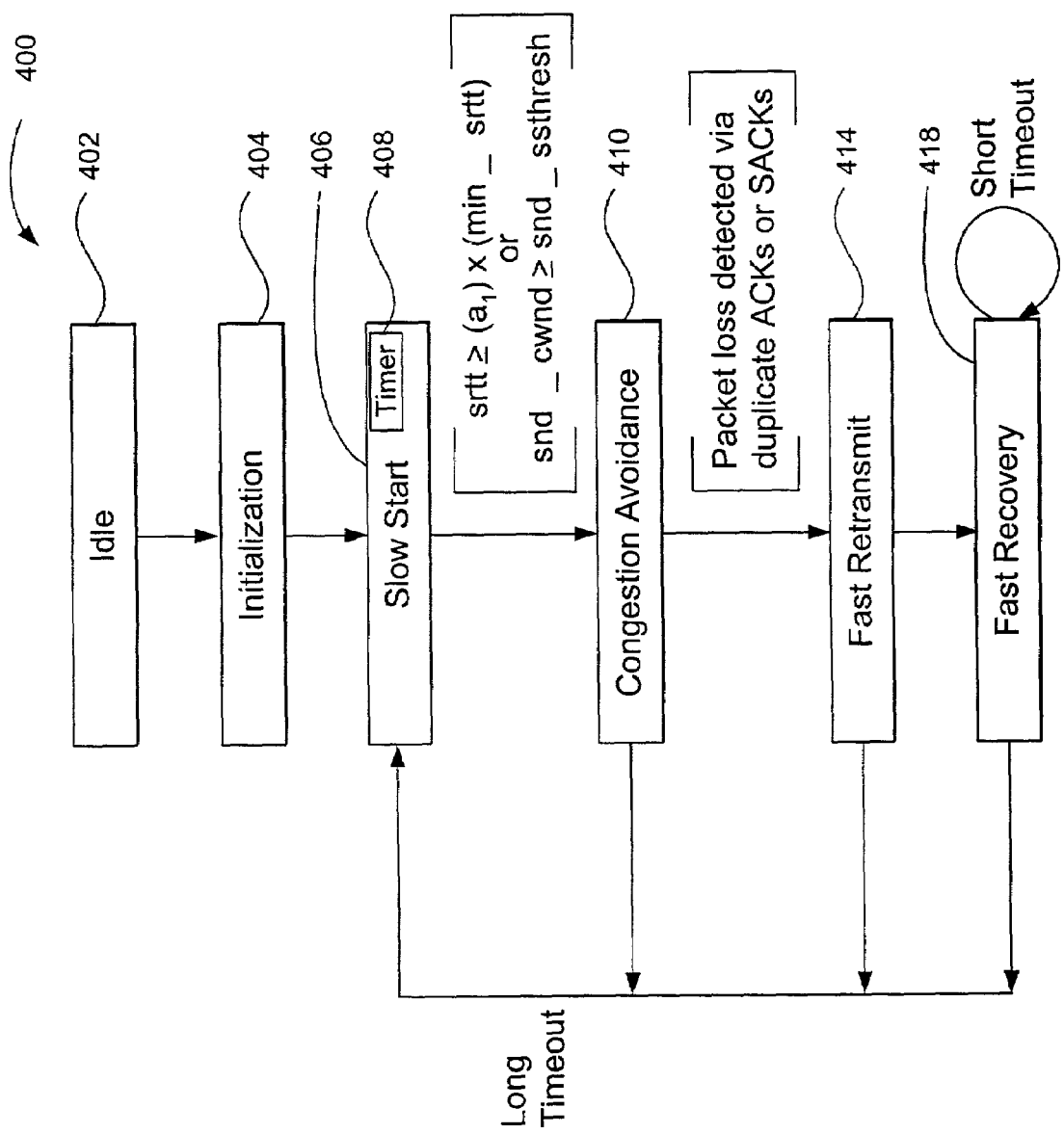
FIG. 4 illustrates an exemplary method in flowchart form providing for traffic management of data communications in accordance with an embodiment of the present invention.

FIG. 4 illustrates an exemplary method in flowchart form for providing traffic management of data communications in accordance with an embodiment of the present invention. The exemplary traffic management process illustrated in FIG. 4 may be deployed in various configurations or devices that participate in, or regulate data communications. For example, the traffic management process 400 may be deployed within the TCP layer 106 of the server 102 in the embodiment of FIG. 1, or within the TCP layer 236 of the service module 228 in the embodiment of FIG. 2. Generally, when a client initiates a TCP connection to a server, the connection goes through an initial setup process where the client and server exchange handshake control messages that include synchronization and acknowledgement signals. When the handshake process is completed, the client and server can transmit data packets to each other. According to the embodiment of FIG. 4, data transport control is managed through a series of states that guide the traffic management process depending on various trigger events that occur within the system, such as arrival of acknowledgement (ACK) or selective acknowledgement (SACK) signals, or the expiration of a transmit timer, short timer or long timer. In various embodiments, specific actions or transitions between the states of the traffic management process take place in response to such trigger events.

As illustrated in FIG. 4, the exemplary traffic management process includes an idle state 402, an initialization state 404, a slow start state 406, a congestion avoidance state 410, a fast retransmit state 414 and a fast recovery state 418. Various aspects of the present invention are deployed within these states to provide enhanced data traffic management, including, for example, a transmit timer 408 included within the slow start state 406 that controls the transmission rate of data packets and enables more efficient management of data transmission.

In operation, when a data transmission is initiated, the traffic management process 400 leaves the idle state 402 and enters the initialization state 404. In the initialization state 404, a number of variables relevant to traffic management are initialized, including, for example, a congestion window (snd_cwnd) that estimates the delay-bandwidth product of the connection and may influence the transmission rate of data packets. Once initialization of relevant variables is completed, the traffic management process enters the slow start state 406. During the slow start state 406, the congestion window is increased relatively fast while attempting to anticipate traffic congestion and transmission rate limitations. Availability of data transmission resources is inferred from various conditions, including based on measurements of various characteristics of the network, such as a round trip time. When network congestion is detected along the transmission channel, possibly based on a set of conditions involving a comparison of a smooth estimate round trip time (srtt) with a minimum smooth estimate round trip time (min_srtt) and a comparison of a congestion window (snd_cwnd) with a congestion window threshold (snd_ssthresh), the traffic management process 400 enters the congestion avoidance state 410. These conditions will be further described in conjunction with step 624 of the exemplary acknowledgment processing system illustrated in FIG. 6B.

In the congestion avoidance state 410, the congestion window is altered more gradually based on a four-state process in an attempt to efficiently utilize the communication channel while minimizing or avoiding losses. If the available bandwidth increases, the congestion window is correspondingly increased, which results in a decrease of the period of a transmit timer according to an aspect of the present invention. A decrease in the period of the transmit timer may translate in an increase of the transmission rate. Consequently, upon detection of an increase in the available bandwidth, the transmission rate may be increased to ensure efficient utilization of network resources. Conversely, if the available bandwidth decreases, the congestion window may be decreased, thereby increasing the period of the transmit timer and curtailing the transmission rate to avoid overloading the transmission channel.

If persisting traffic congestion is detected along the transmission channel, a long timeout trigger may lead the traffic management process 400 to return to the slow start state 406, where the congestion window is reset to its initial value. If only limited packet loss is detected via a predetermined number of duplicate acknowledgement signals, selective acknowledgement signals or short timeouts, however, the traffic management process enters the fast retransmit state 414. In the fast retransmit state 414, data packets presumed lost are retransmitted. Once data packets are retransmitted in the fast retransmit state 414, the traffic management process 400 enters the fast recovery state 418. In the fast recovery state 418, a number of system variables are adjusted, including possibly reducing the congestion window or increasing the sender advertised window, while data packets are retransmitted. The traffic management process may remain in the fast recovery state 418 in response to short timeouts until a long timer expires or until additional acknowledgment signals are received. If the long timer expires, the traffic management process 400 returns into the congestion avoidance state 410.

Figure 5:
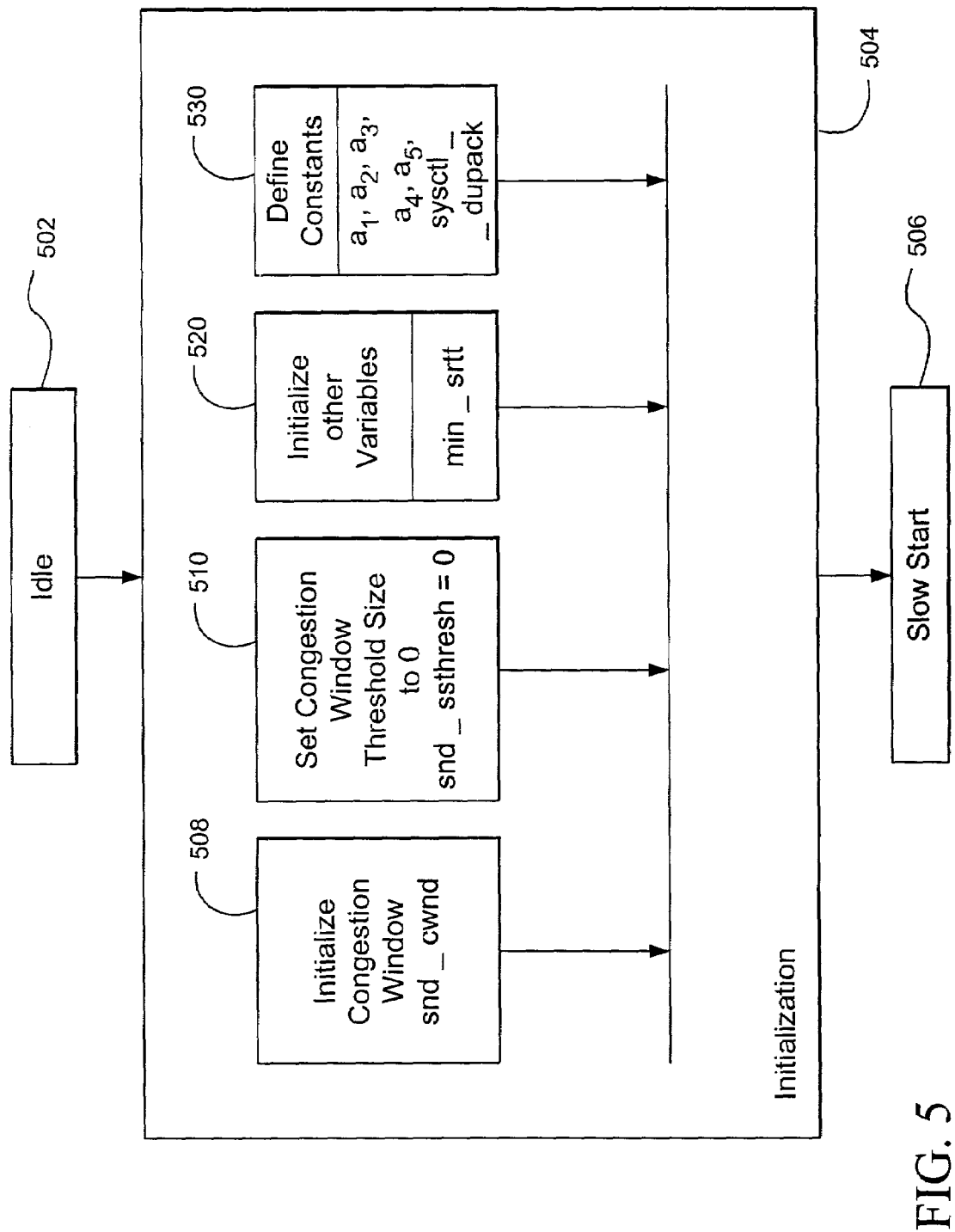
FIG. 5 illustrates a flowchart showing exemplary processes that may take place during an initialization state in accordance with an embodiment of the present invention.

FIG. 5 illustrates a flowchart showing exemplary processes that may take place during an initialization state in accordance with an embodiment of the present invention. An initialization state 504 illustrated in FIG. 5 may correspond to the initialization state 404 in the embodiment of FIG. 4. In the initialization state 504, a number of variables and constants relevant to traffic management are initialized as further described below. In the embodiment of FIG. 5, an initialization state 504 is located between the idle state 502 and the slow start state 506. A number of processes are executed during the initialization state 504 to configure various variables that may be used subsequently to manage the data traffic.

These processes include initialization of a congestion window (snd_cwnd) (508), of a congestion window threshold (snd_ssthresh) (510), and of other variables (520) and constants (530) as further described below. Each of these initialization processes may be performed independently, either before, simultaneously with, or subsequent to other initialization processes. For example, initialization of the congestion window (508) may take place before, at the same time with, or after initialization of the congestion window threshold (510). Once initialized, the corresponding variables or constants are stored in memory for subsequent use during the traffic management process that controls data communications in connection with various embodiments of the present invention.

According to an embodiment of the present invention, the congestion window (snd_cwnd) is used to initially determine the period of a transmit timer and implicitly the data packet transmission rate. This congestion window is initialized in step 508 to a particular value determined by a configurable parameter. Depending on various factors, as further described below, the congestion window may be initialized to a size of 2 or 3 data packets. In an exemplary case, the congestion window for a new connection between a server and a client established over a channel shared by pre-existing connections between the same server and client may be initialized based on the minimum smoothed estimate of round trip time determined over all pre-existing connections.

In another exemplary case, the congestion window is initialized based on historical information regarding previous data communications over a particular data channel. For example, when a data connection is set up over a particular wireless channel, an embodiment of the present invention may retrieve information that was previously saved regarding the transmission characteristics of that particular channel (e.g., channel physical medium error rate, bandwidth, channel reliability, or link availability) and may initialize the congestion window based on such information. For example, for a wireless channel that exhibited relatively low bandwidth and high error rates, the congestion window may be initialized to a smaller value (e.g., snd_cwnd=2).

In yet another exemplary case, the congestion window may be initialized based on the identity of a subscriber that originates or receives a data transmission. The identity of particular subscribers may be determined based on Internet Protocol (IP) addresses or based on identity information provided as part of the data received from the subscriber. For example, in one embodiment, subscribers may be allocated priority levels, and corresponding congestion windows may be initialized to provide transmission rates and quality of service proportional to their respective priority levels. For example, a subscriber with a higher priority may be allocated a larger initial congestion window corresponding to a higher initial data rate. Alternatively, the congestion window may be initialized based on the type of data being transmitted. For example, a connection a for multimedia data streaming may receive a larger initial congestion window as compared to a connection established to transmit an email message to account for the larger data rate requirement of the multimedia connection.

A congestion window threshold variable (snd_ssthresh) that controls the behavior of an embodiment of the present invention during the slow start state is initialized in step 510. In one case, the congestion window threshold is initialized to zero to disable an initial comparison performed in step 624 of the exemplary process illustrated in FIG. 6B. Additional variables associated with various aspects of the present invention are initialized in step 520, including a minimum smoothed estimate of round trip time (min_srtt) value. In one case, when multiple connections between a server and a client share a communication channel, the minimum smoothed estimate round trip time for a new connection being established over that communication channel may be set equal to the minimum value of the smoothed estimate round trip time measured for existing connections. If there are no pre-existing connections, the minimum smoothed estimate round trip time may be initialized to zero.

A number of constants that may be employed at different stages of the traffic data management process according to various embodiments of the invention are initialized in step 530. These constants include, for example, a threshold value that may be used during a slow start state to decide whether to enter a fast retransmit state ("sysctl_dupack"), a constant "a1" used by an embodiment of the invention operating in a slow start state to decide whether to remain in that state under various circumstances, a constant "a2" that may be employed to detect traffic congestion, a constant "a3" that may be used to determine how aggressively to probe during a congestion control state based on the number of packages acknowledged by incoming messages, a constant "a4" that may be used to determine a smoothed congestion window according to a recurrent formula and a constant "a5" that may help determine the extent to which the transmission rate is decreased during the fast retransmit state.

Figure 6A:
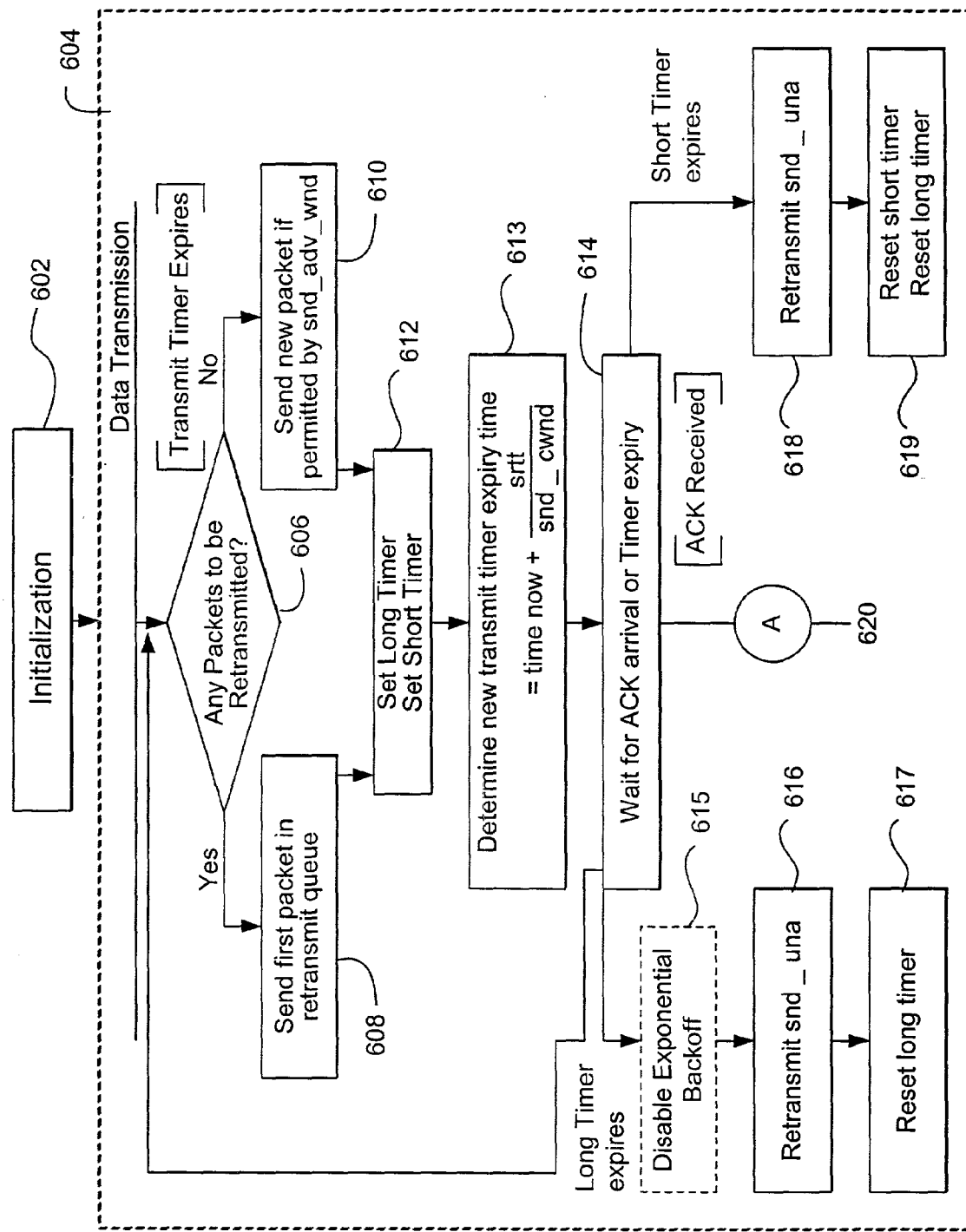
FIG. 6A illustrates a flowchart showing exemplary processes that may take place during data transmission in accordance with an embodiment of the present invention.

FIG. 6A illustrates a flowchart showing exemplary processes that may take place during data transmission in accordance with an embodiment of the present invention.

According to an aspect of the present invention, data packet transmission or retransmission takes place at intervals determined by a transmit timer. Transmission or retransmission of data packets may occur while a traffic management process progresses through various states as illustrated by various embodiments of the invention, including, for example, the slow start, congestion avoidance, fast retransmit or fast recovery states illustrated in the embodiment of FIG. 4. Certain conditions defined within some of these states may supersede the transmit timer under specific circumstances and may prevent transmission or retransmission of particular data packets. For example, if an embodiment of the invention determines that the network transmission resources are overloaded, transmission of additional data packets may be suspended until the congestion in the network subsides.

According to various aspects of the present invention, three types of timers are employed to provide trigger events that induce actions within, or transitions between, various states of a traffic management process: a transmit timer, a short timer and a long timer. According to an embodiment of the invention, the transmit timer provides a mechanism for controlling the data transmission rate by adjusting the period of the transmit timer based on modification of the congestion window and smoothed round trip time measurements. Another embodiment of the invention provides a short timer that may be used to detect loss of individual data packets. Yet another embodiment provides a long timer that may be used to detect more severe losses of multiple data packets.

According to an aspect of the present invention, the data transmission rate at which data packets are sent is controlled by the transmit timer with a period determined based on the ratio between a then-current value of a smoothed estimate of a round trip time and a then-current value of a smoothed congestion window. The smoothed estimate of the round trip time between a server and a client represents a measure of the time that messages or control signals take to propagate between the two devices. In one embodiment, the smoothed estimate of the round trip time (srtt) at a particular time "t" is determined according to the following formula:

$$srtt[t]=K_1 * srtt[t-1]+K_2 * measured\_rtt, \quad (1)$$

where measured_rtt corresponds to the round trip time ("rtt") measured between the server and the client. The round trip time may be measured based on the time that passes between transmission of a particular packet and receipt of an acknowledgment from the client corresponding to that packet. The smoothed estimate of the round trip time (srtt) may be determined based on the average and mean deviation of round-trip time samples previously measured by the system and may be periodically updated to include recent measurements. In one case, the round trip time is determined based only on a predetermined number of more recent measurements. In another case, the round trip time may be determined based on all previous available measurements. The smoothed estimate of the round trip time provides a more accurate indication of the actual propagation delay of data travelling between the server and the client as compared to the round trip time. In equation (1), $K_1$ and $K2$ are configurable parameters that may be set to different values depending on the characteristics of the network, server and client. In one embodiment, $K_1$ is set to ⅞ and $K2$ is set to ⅛.

The smoothed congestion window represents a weighted measure of the number of data packets that the server is prepared to transmit to the client and is determined based on the then-current congestion window. The congestion window estimates the delay-bandwidth product of the connection to the receiver. In various embodiments, the congestion window is determined based on acknowledgement signals provided by the client, and/or on information regarding the condition of the network inferred by the server through other methods (e.g., based on a timer, or based on measurements of network characteristics such as round trip time). According to one embodiment of the present invention, the smoothed congestion window is periodically updated using the following formula:

$$smoothed\_cwnd[t]=a4*smoothed\_cwnd[t-1]+(1-a4)*snd\_cwnd, \quad (2)$$

where smoothed_cwnd [t] represents the smoothed congestion window at a particular moment in time generically denoted as t, snd_cwnd represents the then current congestion window, and a4 represents a constant that may have been initialized in step 530 of initialization state 504 from the embodiment of FIG. 5.

In light of equation (2), in a corresponding embodiment, the period of the transmit timer controlling the transmission rate of data packets may be expressed as, $$T=srtt[t]/smoothed\_cwnd[t], \quad (3)$$

where srtt[t] represents the then-current value of a smoothed estimate of the round trip time between the sending and the receiving devices determined in accordance with equation (1), and smoothed_cwnd [t] is the smoothed congestion window determined in accordance with equation (2). According to an embodiment of the present invention, a server transmits data packets to a client at intervals determined in accordance with equation (3). The corresponding data transmission rate "R" is the inverse of the period of the timer, i.e., R=1/T.

According to this aspect of the present invention, data packets are transmitted at a rate determined based on the ratio between a smoothed estimate of the round trip time and a smoothed congestion window. In one case, this transmission rate is employed for transmission of all data packets, including retransmissions of data packets lost or delayed in the communication channel or network. In an alternative case, this transmission rate is employed only for transmission of selected data packets. In determining the transmission rate as illustrated above, equations (2) or (3) may be modified to include additional terms or scaling factors. For example, the transmission rate may be determined using different formulas for different data packets, depending on conditions existing in the network or along a communication channel.

An advantage of employing a data transmission rate determined in accordance with this aspect of the present invention is that bursts in data transmissions may be decreased or eliminated. Alternatively stated, this aspect of the present invention may help avoid situations where bursts of data are transmitted within short periods of time with an erroneous assumption that the communication channel or receiving device may accommodate the corresponding data surge. This situation may occur under typical TCP implementations, for example, when signals acknowledging receipt of data packets are sent by a client connected to a high-speed network through a slow channel. In that case, acknowledgement signals that are initially spaced out in time by the slower channel may be compressed in time while propagating through the faster network, and may reach the server within a relatively short period of time. This may cause the server to erroneously assume that the close spacing of acknowledgement signals indicates that a high-speed data path exists between the client and the server, and therefore transmit information at a high data rate that overloads the available transmission resources. This situation may also occur if acknowledgement signals that are initially spaced out in time become queued up along the transmission path due to traffic congestion and are eventually compressed in time. In both of these situations, a server utilizing typical TCP may react by sending a burst of data without regard of the actual transmission resources in the network, thereby inducing or exacerbating traffic congestion or data loss. According aspects of the present invention, however, data packets are transmitted at a particular transmission rate based on a transmit timer, thereby avoiding sudden variations in the data rate. This may help alleviate or redress performance limitations that may otherwise be encountered by a server and client communicating via TCP under circumstances similar with the ones described above.

Another embodiment of the present invention provides a short timer that may be used to detect loss of data packets. To account for the possibility of packets being lost subsequent to an original transmission or a retransmission, a short timer may be set when a packet is transmitted or retransmitted. Expiration of the short timer leads to a short timeout state. This provides an additional mechanism (in addition to typical TCP duplicate acknowledgments, selective acknowledgment and timeout) for detecting packet loss. The short timer may be important when selective acknowledgments (SACKs) that can explicitly indicate packet loss are not available, and may be disabled if selective acknowledgments are available. The short timer may also be used to maintain connections active during extended disturbances occurring along the communication channel, such as deep fades, by preventing the traffic management process from reacting prematurely to an apparent termination of the connection. For example, an embodiment of the invention may maintain a connection with a client over a communication channel that experiences an extended breakdown (e.g., a prolonged state of congestion or a deep fade) without terminating the connection to the client. According to an aspect of the present invention, this may be achieved because certain actions and transitions between states (e.g., termination of a connection) occur in response to certain events, such as timeouts or receipt of acknowledgment signals. For example, an embodiment of the invention may be configured to respond to expiration of a short timer by re-transmitting a particular data packet at a particular data rate rather than decreasing the data rate or waiting for receipt of an acknowledgment signal.

The timeout interval of the short timer may be defined based on the then-current smoothed estimate of the round trip time and the maximum value of the smoothed estimate of the round trip time recorded since the previous timeout. For example, the period (srto) of the short timer may be determined based on the following formula:

$$srto = \min(srtt + 2*mdev, \max\_srtt + mdev),$$

where srtt is the then-current smoothed estimate of the round trip time. Additionally, "mdev" corresponds to a running average of the deviation of the measured value of the round trip time from the average value of the round trip time, and may be computed as follows:

$$mdev[t] = \frac{3}{4}*mdev[t-1] + \frac{1}{4}*|measured\_rtt - srtt[t]|.$$

An aspect of the present invention may also provide a long timer that may be used to detect extended periods of silence from the client or more severe data loss, including, for example, loss of multiple data packets. The long timer may be reset upon transmission or retransmission of a data packet or upon receipt of an acknowledgment signal. Expiration of the long timer leads to a long timeout state and induces the traffic management process to transition into a slow start state from a congestion avoidance state, a fast retransmit state, or a fast recovery state. The timeout interval of the long timer may be defined based on the then-current smoothed estimate of the round trip time and the maximum variation of the round trip time. For example, the expiry period of the long timer may be determined using the following formula:

$$rto = \max(4*srtt, 2*srtt + 4*\max\_deviation\_in\_rtt),$$

where max_deviation_in_rtt corresponds to the largest value of mdev determined over an arbitrary period of time. In one case, max_deviation_in_rtt is the largest value of mdev recorded since the initialization of that particular connection.

In the embodiment of FIG. 6A, once initialization of various variables and constants takes place in initialization state 602, data transmission may begin. As described above, according to an aspect of the invention, transmission of data packets takes place at a transmission rate determined based on a transmit timer. Transmission of data may occur simultaneously with progression of the traffic management process through various states like slow start, congestion avoidance, fast retransmit and fast recovery as illustrated in FIG. 4. While in each of these states, the traffic management process may modify various parameters (e.g., the congestion window) in response to different conditions present in the network (e.g., traffic congestion). Modification of such parameters may result in adjustment of the period of the transmit timer, and consequently of the transmission rate.

In the embodiment of FIG. 6A, a data transmission process 604 commences upon expiration of a transmit timer. In one embodiment, the expiry period of the transmit timer is determined using equation (3) from above. Upon expiry of a transmit timer, the traffic management process advances to step 606. A decision is made at step 606 whether any packets need to be retransmitted. Packets may need to be retransmitted, for example, if they were previously declared lost by the system, as determined by receipt a predetermined number of duplicate acknowledgements, expiration of the short timer, etc. If packets do need to be retransmitted, the first packet in the retransmit queue is transmitted at step 608.

If the decision at step 606 indicates that no retransmission of packets is necessary, the traffic management process progresses to step 610 where it transmits a new packet if permitted by the sender advertised window (snd_adv_wnd), which is included in each acknowledgement and indicates the size of the clients buffer. An aspect of the present invention provides a sender advertised window that helps determine the amount of data that the server may send and assists with recovery from data errors. The sender advertised window is further described below in connection with the embodiment of FIG. 9.

The fact that the transmit timer controls both retransmission of lost data packets in step 608 and transmission of new data packets in step 610 enables synchronization of the transmit and retransmit processes to effectively manage data traffic. Since, as previously discussed, the period of the transmit timer is adjusted dynamically to ensure efficient utilization of available network transmission capacity, and therefore data packets are transmitted only when bandwidth is anticipated to be available, the embodiment of FIG. 6A effectively multiplexes retransmitted and new data packets through the transmission channel. As a result, this embodiment of the invention achieves a fair queuing mechanism that efficiently allocates bandwidth for both transmission and retransmission of data to help optimize overall throughput.

From either step 608 or step 610, the traffic management process proceeds to step 612 where it sets both a short timer and a long timer as previously discussed. The short timer detects loss of individual data packets, while the long timer identifies more severe losses involving multiple data packets. The traffic management process then enters step 613 where it determines the next expiration period for the transmit timer, which indicates when the next data packet will be transmitted. The period of the transmit timer depends on the ratio of the smoothed round trip time to the smoothed congestion window, as was described above in connection with equation (3). At step 613, to determine the next expiration period of the transmit timer, the system increments the then-current time recorded by the timer by the value T obtained from equation (3).

The system then enters step 614, where it waits for either of the following three triggering events: expiration of the short timer previously set in step 612, expiration of the long timer previously set in step 612, or receipt of an acknowledgement signal from the client. Step 614 is a default state that recurs throughout various phases of the traffic management process and provides a phase in which the system awaits one of the aforementioned triggering events to determine the subsequent evolution of the system. If the transmit timer set in step 613 expires before the short timer or the long timer, then the traffic management process returns to step 606 to attempt to transmit or retransmit a data packet. If the short timer set in step 612 expires first, however, the system assumes that a data packet has been lost and progresses to step 618 to retransmit the packet. In one embodiment of the invention, the system retransmits the first data packet in the transmission sequence that has not been acknowledged as received by the client. The sequence number for this data packet is denoted in step 618 as snd_una. In this case, the client has acknowledged all data packets in transmission sequence through and including snd_una−1.

In a different embodiment, the system may retransmit a different data packet than snd_una, possibly one of the data packets that were sent to the client after the snd_una packet. Upon retransmission of a data packet in step 618, the system resets both the short and the long timers in step 619.

At step 614, if the long timer expires before the transmit timer or the short timer, thereby indicating a possible loss of multiple data packets, the traffic management process enters an optional step 615, where it disables or delays a TCP exponential backoff mechanism that typically exists in TCP. Typical TCP utilizes a single timer to identify prolonged periods of non-responsiveness from the client, possibly indicating network congestion or disturbances along the communication channel. In such TCP implementations, expiration of the timer induces a timeout state that progressively increases subsequent periods of the timer exponentially (typically as a power of 2). Consequently, in typical TCP implementations, sustained lack of response from the client may result in successive timeouts with exponentially-increasing delays. This may lead to excessive decrease of the data transmission rate, extended stalling of the transmission, or loss of connection.

By utilizing a long timer to delay or disable this backoff mechanism (e.g. by delaying the backoff mechanism for D expirations of the long timer), an aspect of the present invention may avoid such exponential increase in the period of successive timeouts and associated disadvantages. More specifically, the period of the long timer may be controlled based on a smoothed estimate of the round trip time as described above in connection with the embodiment of FIG. 6A, and may therefore be maintained within a more desirable range. Furthermore, because of the presence of the short timer, the long timer may be made longer than the retransmit timeout ("RTO") value that exists in typical TCP implementations, thus reducing the occurrence of spurious timeouts. In one embodiment, this may be achieved by making the period of the short timer smaller than the period of the long timer such that the short timer tends to expire before the long timer, and by resetting the long timer whenever the short timer is reset (e.g., upon transmission or retransmission of data packets). Consequently, in this embodiment, as long as transmission or retransmission of packets is permitted by the sender advertised window, the short timer essentially disables the operation of the long timer. The long timer is only relevant in this embodiment if a corresponding sub-process is triggered by arrival of an acknowledgment signal since the short timer is not reset by such an event. In that case, if transmission or retransmission of data packets is suspended for a sufficiently-long period of time, the long timer is operational and may expire before the short timer. From optional step 615, the traffic management process advances to step 616 where it transmits the next packet expected by the client, i.e., the packet with sequence number snd_una. The long timer is then reset in step 617.

Figure 6B:
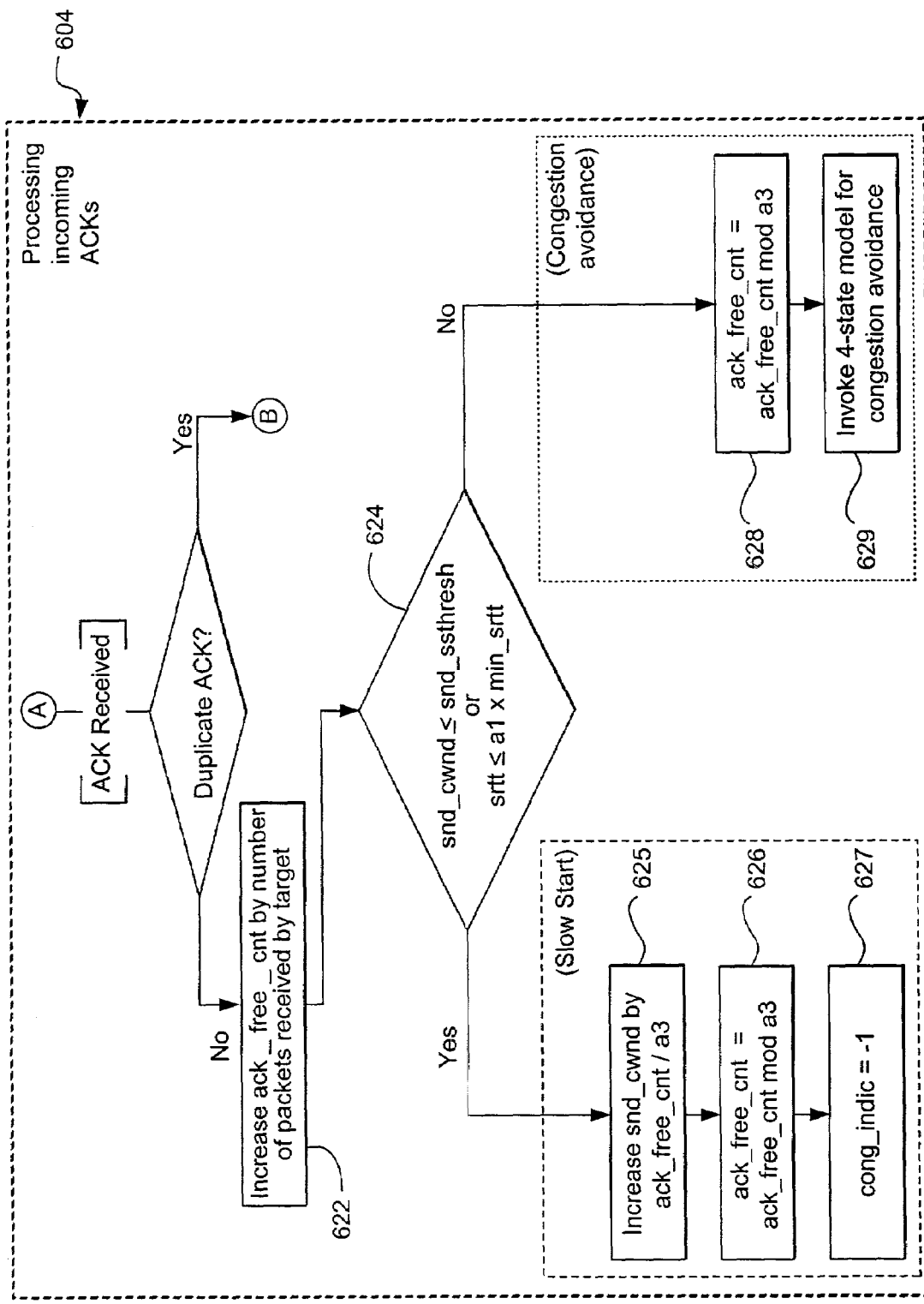
FIG. 6B illustrates a flowchart showing exemplary processes that may take place while processing incoming acknowledgment signals in accordance with an embodiment of the present invention.

If an acknowledgment signal is received while the traffic management process is expecting triggering events in step 614, the traffic management process advances to branch point "A," from where it enters step 620 of the flow chart illustrated in FIG. 6B. FIG. 6B illustrates a flowchart showing exemplary processes that may take place while processing incoming acknowledgment signals in accordance with an embodiment of the present invention. At step 620, a decision is made whether the acknowledgment signal received in step 614 of the embodiment of FIG. 6A is a duplicate acknowledgment. Duplicate acknowledgments are acknowledgments that correspond to the same data packet and may indicate that a preceding data packet was not received, possibly because it is lost or because data packages were reordered by the network. Duplicate acknowledgments may be generated when the client expects a data packet with a specific sequence number but receives a data packet with a higher sequence number. In that case, for each out-of-sequence packet received, the client generates an acknowledgment signal that identifies the data packet originally expected. In an alternative implementation, the client generates an acknowledgment signal only upon receipt of multiple out-of-sequence packets.

If the decision at step 620 is that the incoming acknowledgment signal is not a duplicate acknowledgment, the system progresses to step 622 where it records the number of data packets that were successfully delivered to the receiver by increasing a corresponding variable ack_free_cnt. The variable ack_free_cnt maintains a count of the number of buffers freed by incoming acknowledgment signals. Determination of the number of data packets successfully delivered to the receiver may be made based on various criteria. In one embodiment, if successive incoming acknowledgments correspond to nonconsecutive data packets in the data stream, the number of packets successfully delivered to the receiver is inferred in step 622 by assuming that all data packages numbered between those corresponding packages will be eventually received. In this case, acknowledgement signals may be interpreted to indicate that all preceding unacknowledged data packets will be successfully delivered, and the number of such unacknowledged packets is used to increment the variable ack_free_cnt in step 622. For example, if the server receives acknowledgments for data packets with sequence numbers up to and including packet 152, and if the next acknowledgment corresponds to packet 155, the server assumes that packets 153 and 154 will be eventually received and increments ack_free_cnt by two. If the incoming acknowledgment signals do not indicate any gaps in the sequence of packets received by the client, however, each acknowledgment signal is interpreted to indicate successful delivery of a single corresponding data packet in step 622, and the variable ack_free_cnt is incremented by one for each acknowledgement signal received.

The traffic management process then progresses to step 624, where a decision regarding the congestion state of the network is made. The decision process in step 624 comprises two conditions. The first condition assesses whether the congestion window snd_cwnd is smaller or equal to the congestion window threshold snd_ssthresh:

$$snd\_cwnd \vdash snd\_ssthresh$$

This condition may employ past history regarding the data channel, the identity of a subscriber or the nature of the data being transmitted to determine how far the congestion window should be relatively-rapidly increased. The congestion window threshold may have been previously initialized to zero in step 510 of initialization state 504 from FIG. 5. Consequently, in that case, this condition in step 624 would be initially inoperative, and the second condition would control the original decision in step 624. The congestion window threshold may be updated to a non-zero value subsequently, and the first condition would then become operative.

The second condition in step 624 compares the then-current smoothed estimate of the round trip time (srtt) with a weighted value of the minimum recorded smoothed estimate of the round trip time min_srtt:

$$srtt \vdash a1 * min\_srtt$$

This condition is particularly important when the first condition is inoperative. One case when the first condition in step 624 is inoperative occurs when the congestion window threshold is equal to zero as previously described. The first condition in step 624 may also be inoperative if past history relevant to the condition is missing (e.g., relevant information regarding past history was not stored or was improperly retrieved) or is unreliable (e.g., after a timeout). In the expression of the second condition in step 624, the minimum recorded value of the smoothed estimate of the round trip time (min_srtt) represents the minimum smoothed estimate of the round trip time that was recorded during previous measurements and is used as a measure of the propagation delay. This value is shared among multiple connections to a single host that share a communication channel, and may be employed to avoid destructive competition for bandwidth among these connections.

In one embodiment, weight $a_1$ assigned to the minimum smoothed estimate of the round trip time in step 624 is the constant used to decide whether to remain in the slow start state that was initialized in step 530 of initialization state 504 from FIG. 5. The second condition in step 624 may be broadly interpreted to permit rapid growth of the congestion window until the queuing delay is at least $(a_1-1)$ times the propagation delay. This interpretation is more accurate in typical networks that have buffering of the order of the bandwidth-delay product. In a particular embodiment, the value of $a_1$ is equal to 1.2.

If both conditions in step 624 evaluate as true (indicating that growth of the congestion window may continue at a relatively fast rate), the system branches into step 625 of the slow start state, where it increases the size of the congestion window based on the value of the variable ack_free_cnt that was previously updated in step 622. According to an aspect of the present invention, the congestion window is increased based on the number of data packets or data segments that are acknowledged as received by a client. In one embodiment, the congestion window, and indirectly the data transmission rate, are adjusted based on the number of data packets acknowledged by acknowledgement signals sent by a client. Various methods for acknowledging data packets using acknowledgement signals were previously discussed in connection with updating the variable ack_free_cnt in step 622. In a particular embodiment, the number of data segments or data packets effectively acknowledged by an acknowledgement signal sent by a client device is weighted and is used thereafter to increase the congestion window. For example, if an incoming acknowledgement signal communicates that the client device has received a total of five data packets, the congestion window may be increased by five data packets. Alternatively, the congestion window may be increased by a different number of packets if a weighing function is used to weigh the number of packets acknowledged. In the latter example, for a particular weighing function, if an incoming acknowledgement signal communicates that the client device has received five data packets, the congestion window may be increased by three or by nine data packets, depending on the characteristics and form of the weighing function.

An advantage of this aspect of the present invention is that the data transmission rate does not decrease unnecessarily under certain circumstances, including, for example, when channel communication resources exist but acknowledgement signals are lost. Under such circumstances, when signals acknowledging receipt of data packages by a receiving device are lost and do not reach the server, the server may increase the congestion window by a smaller amount in response to the fewer incoming acknowledgement signals. This may happen under conventional TCP, for example, where the congestion window may be increased by one data packet or data segment for each acknowledgment signal received. This may result in a correspondingly-smaller increase in the data transmission rate, which is undesirable if the data channel has available bandwidth that could accommodate a comparatively-higher transmission rate. An aspect of the present invention may address and potentially resolve this situation by increasing the congestion window, and implicitly the transmission rate, by a relatively-larger amount in response to fewer incoming acknowledgement signals.

An embodiment of the invention employs the process for updating the variable ack_free_cnt that was discussed above in conjunction with step 622 to increase the congestion window in step 625 of FIG. 6B according to the following formula:

$$snd\_cwnd = snd\_cwnd + ack\_free\_cnt/a_3,$$

where $a_3$ is a constant that may be used to determine how aggressively to probe for bandwidth availability while performing congestion control. The variable $a_3$ may have been initialized at step 530 of the initialization state 502 of FIG. 5.

From step 625, the traffic management process advances to step 626 where it updates variable ack_free_cnt using the following formula:

$$ack\_free\_cnt = (ack\_free\_cnt) \bmod (a_3),$$

where "mod" indicates the modulo mathematical operator. The system then configures a state variable cong_indic=−1 in step 627 to indicate that the congestion window may be increased subsequently.

If both of the conditions in step 624 evaluate as false, the system then branches to step 628 of a congestion avoidance state where it updates the variable ack_free_cnt substantially similarly as previously described in connection with step 626. The traffic management process then invokes a four-state model for congestion avoidance. This state model is further described in connection with FIGS. 8A, 8B and 8C.

If the decision in step 620 of the embodiment of FIG. 6B indicates that the acknowledgment signal that prompted the traffic management process to leave step 614 of the embodiment from FIG. 6A was a duplicate acknowledgment signal, this embodiment assumes that a data packet has been lost. Consequently, the system enters a fast retransmit state by progressing to step 662 of the flow process illustrated in FIG. 6C via branch point "B."

Figure 6C:
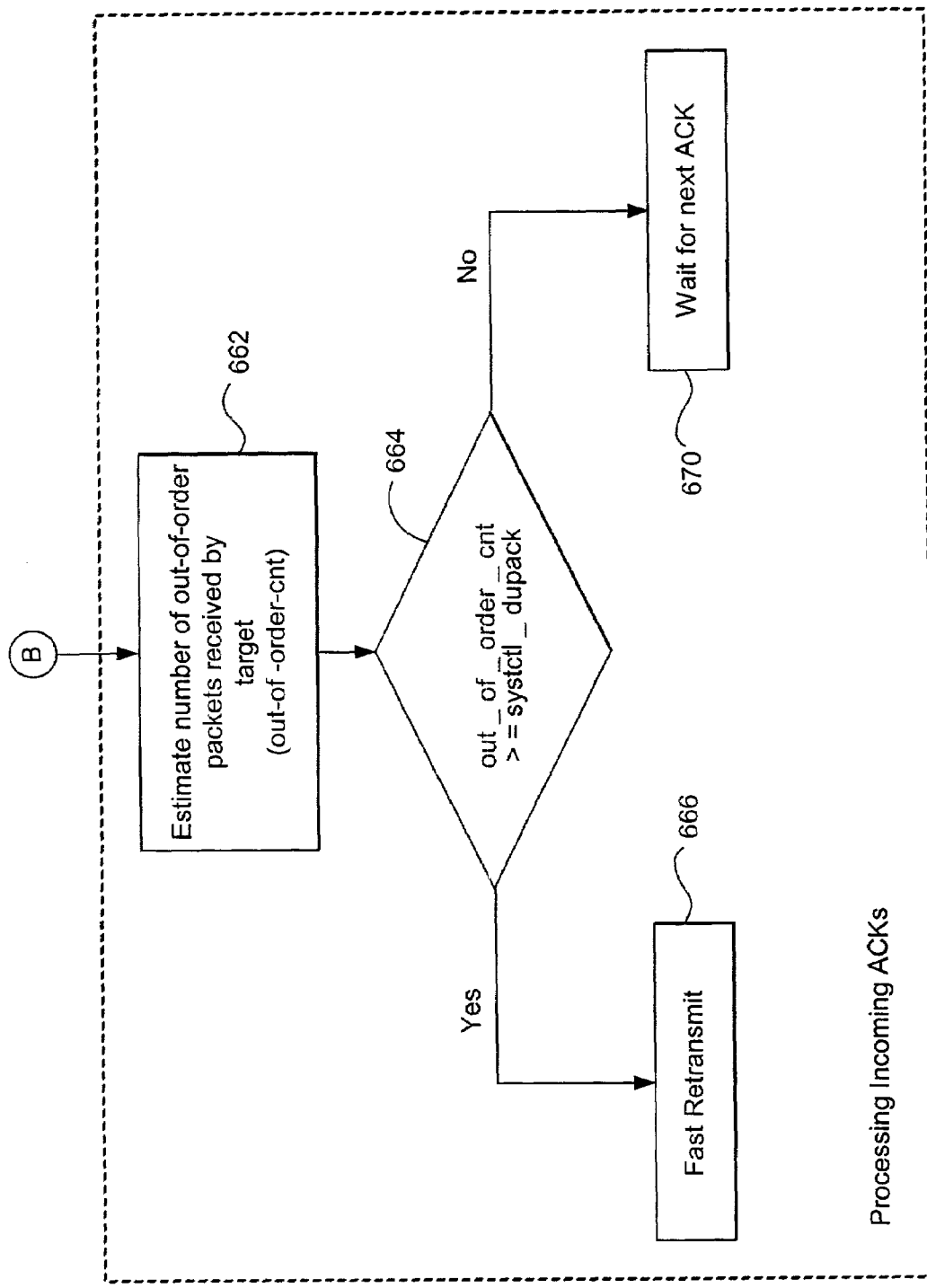
FIG. 6C illustrates a process branch that may be executed while processing acknowledgement signals in conjunction with the embodiment of FIG. 6B.

FIG. 6C illustrates a process branch that may be executed while processing acknowledgement signals in conjunction with the embodiment of FIG. 6B. Branch point "B" from FIG. 6B leads the traffic management process to step 662 in FIG. 6C. In step 662, the system estimates the number of data packets that have been delivered to the receiver out of order and stores this number into a variable out_of_order_cnt. In one embodiment of the present invention, this number is determined based on information provided by a client via selective acknowledgment (SACK) messages. If SACK information is not available, the number of data packets that have been delivered to the receiver out of order may be estimated based on the number of duplicate acknowledgment signals received by the sender. In step 664, the number of data packets that have been delivered to the receiver out of order estimated in step 662 is compared to a threshold variable systctl_dupack that indicates when the system should assume that data packages that have not been delivered within a certain period of time are lost. In one embodiment of the invention, the threshold systctl_dupack is initialized in step 520 of the initialization state 504 from FIG. 5. In a particular embodiment, the threshold systctl_dupack has a value of 3. If the comparison in step 664 indicates that the number of data packets estimated in step 662 to have been delivered to the receiver out of order exceeds the threshold value, the system enters a fast retransmit state in step 666. Otherwise, the system waits for the next acknowledgment signal in step 670.

Figure 7:
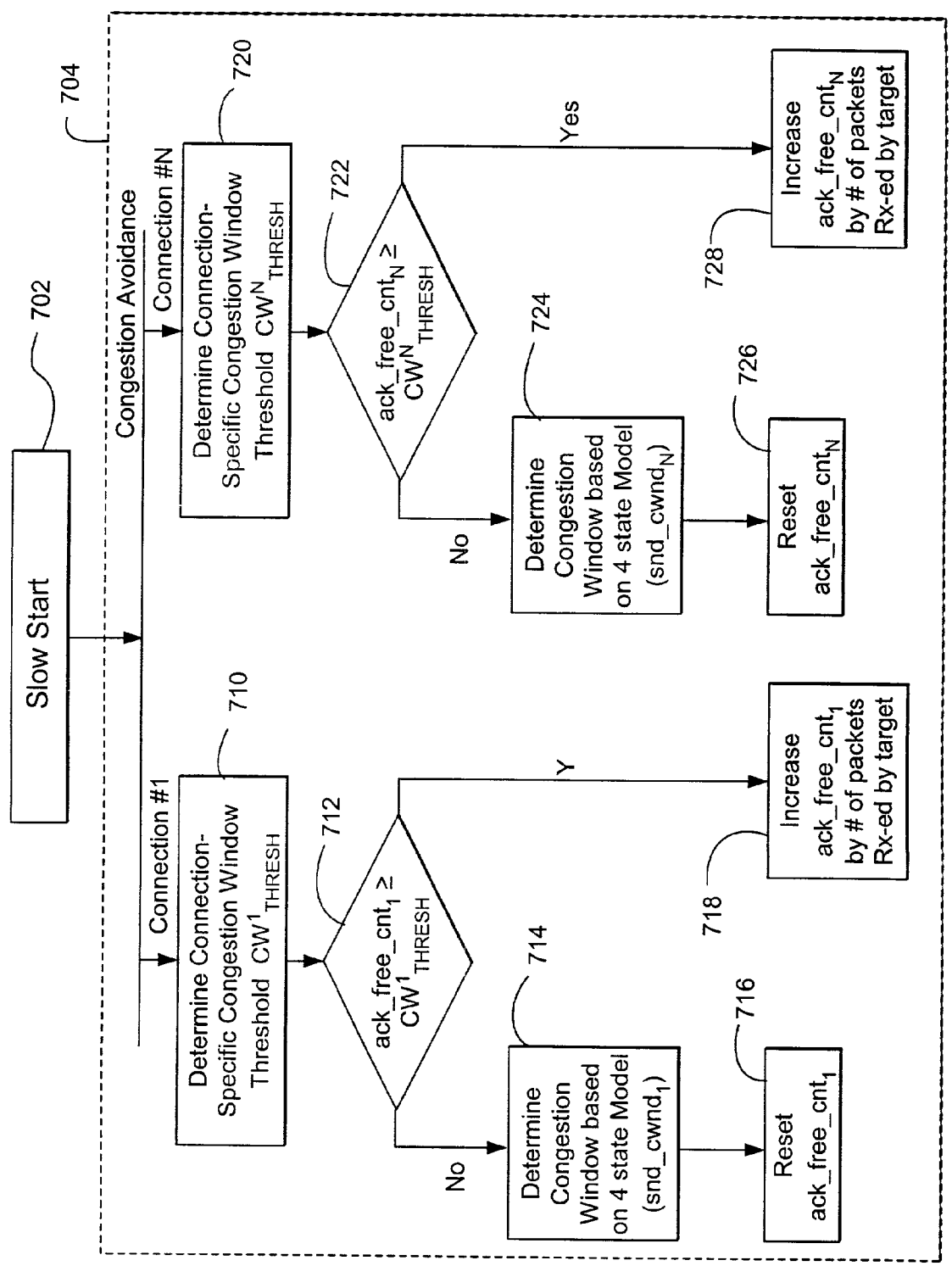
FIG. 7 illustrates a flowchart showing exemplary processes that may take place during a congestion avoidance state in accordance with an embodiment of the present invention.

FIG. 7 illustrates a flowchart showing exemplary processes that may take place during a congestion avoidance state in accordance with an embodiment of the present invention. The system may enter congestion avoidance from step 624 in FIG. 6B. In the congestion avoidance state 704, the transmission rate is altered gradually to utilize efficiently available bandwidth resources while minimizing or avoiding losses. Data packets are transmitted while the transmission rates for individual connections sharing the communication channel are independently and dynamically adjusted to improve global data throughput. The congestion window is updated in response to variations in network capacity using a state diagram and taking into account the weights of various connections sharing the communication channel. Probing for bandwidth availability also takes into account weights of individual connections to avoid destructive competition for channel capacity.

In the embodiment of FIG. 7, the traffic management process enters the congestion avoidance state 704 from the slow start state 702. Once in the congestion avoidance state 704, the system performs traffic management for various independent connections sharing the communication channel. In the embodiment of FIG. 7, these independent connection are suggestively denoted as Connection #1, . . . , Connection #N, where the variable N generically represents an arbitrary number of connections. A number of other independent connections are not shown in FIG. 7, but may comprise steps substantially similar with the steps illustrated for Connection #1 and Connection #N. In certain embodiments of the invention, traffic management for the various individual connections may take place selectively and in any relative order.

In steps 710 and 720, the system employs a host-level manager module to determine connection-specific congestion window threshold variables for each individual connection in a manner that helps achieve a fair queuing mechanism providing weight-based transmission rate allocation for the individual connections. The connection-specific congestion window threshold variables determined in steps 710 and 720 provide Quality of Service support for the traffic management process by making window dynamics during congestion avoidance a function of individual connection weights. In one embodiment, each connection-level congestion window threshold variable is determined based on the following formula:

$$CW^K_{THRESH} = snd\_cwnd_K * \text{average\_weight} / \text{connection\_weight}_K, \quad (4)$$

where $CW^K_{THRESH}$ represents the connection-level congestion window threshold for a particular individual connection generically identified as K, $snd\_cwnd_K$ is the congestion window for that particular connection, average_weight represents a measure of the average of the weights of active connections and $connection\_weight_K$ is the actual weight of that particular individual connection.

For Connection #1, the system then enters step 712 where a decision is made regarding the capacity of the network at that particular time. A variable ack_free_cnt is maintained for each individual connection to indicate how many data packets have been successfully delivered to the receiver, and therefore by how much the network capacity may have increased. In one embodiment, this variable is the variable ack_free_cnt that was described in conjunction with step 622 et seq. in FIG. 6B and is updated based on acknowledgment signals provided by the client in a manner substantially similar with the method described in connection with FIG. 6B. The condition in step 712 evaluates whether the number of data packets that have been delivered to the client, and therefore have left the network, is higher than the weighted threshold allocated to Connection #1. Alternatively stated, Connection #1 is allowed to transmit a certain number of data packets, which depends on its weight, and the condition in step 712 evaluates whether Connection #1 is permitted to use network resources that may have become available, or if another connection with a higher weight should receive priority. The expression for the connection-level congestion window threshold provided by equation (4) permits individual connections with higher weights to change their congestion windows more frequently because their thresholds are smaller. This mechanism provides priority access to the communication channel to connections with higher weights.

If the condition in step 712 evaluates as false, therefore indicating that Connection #1 must yield channel resources to another connection with a higher weight, the system progresses to step 714. In step 714, the congestion window is updated based on a state model that will be further described in conjunction with the embodiments of FIGS. 8A, 8B and 8C. The state model evaluates network resources in step 714 and adjusts the congestion window for Connection #1. The system then enters step 716 where it resets the variable $ack\_free\_cnt_1$ that tracks the number of data packets have been successfully delivered to the receiver. If the condition in step 712 evaluates as true, therefore indicating that Connection #1 has sufficient priority to transmit data, the system permits Connection #1 to transmit a data packet and progresses to step 718 where it increases the variable $ack\_free\_cnt_1$ to account for additional data packets that may have successfully reached the receiver since $ack\_free\_cnt_1$ was last updated.

The description of the connection-level traffic management process for Connection #1 provided above also applies in a substantially similar manner to other individual connections, including Connection #N illustrated in the embodiment of FIG. 7. In applying this description to other connections, however, appropriate reference modifications would have to be made to refer to corresponding steps and variables associated with such other individual connections. For example, when adapting the discussion above to Connection #N, references to the variable ack_free_cnt$_1$ would be instead to variable ack_free_cnt$_N$.

Figure 8A:
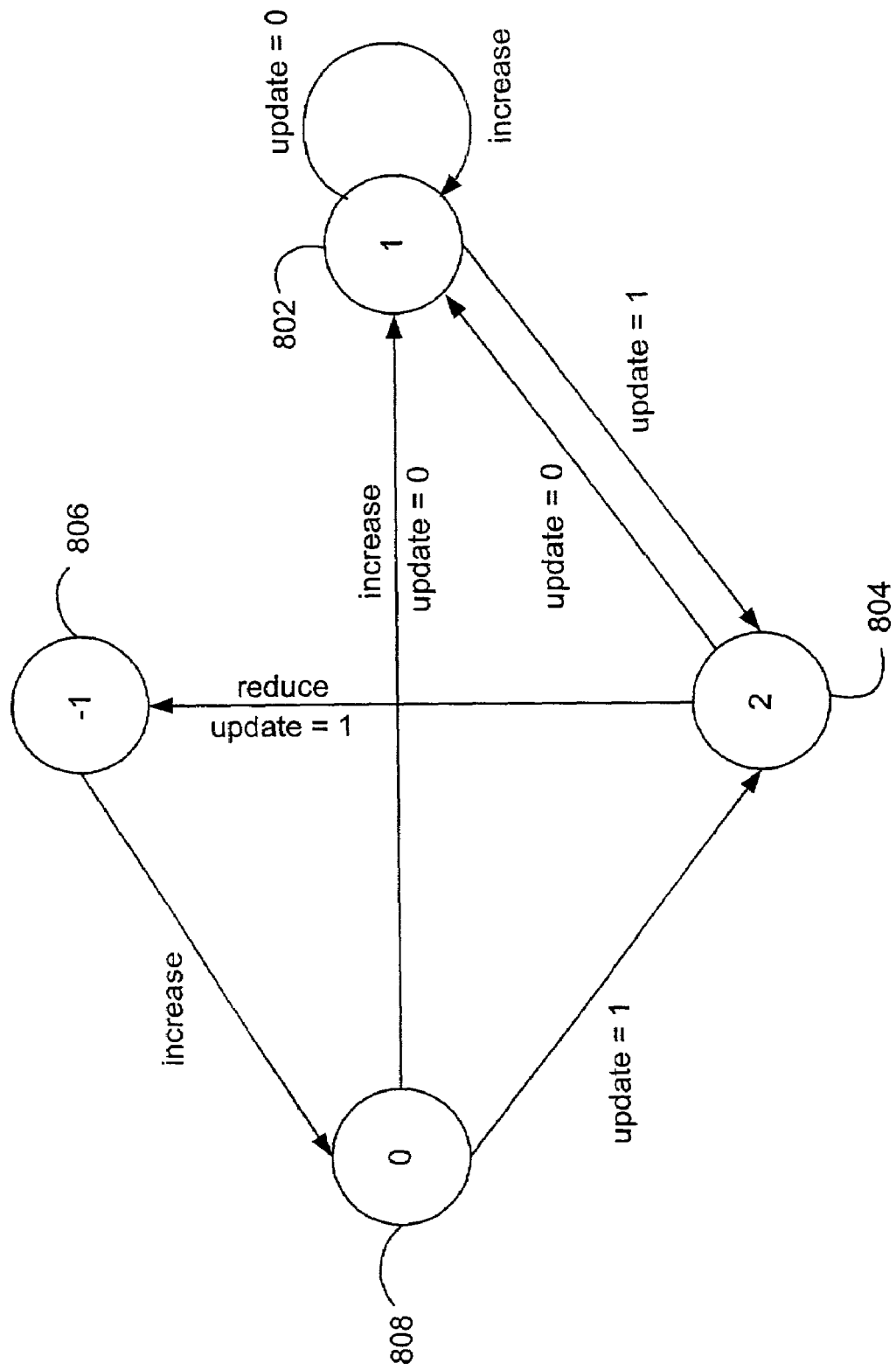
FIG. 8A illustrates an exemplary state model that may be used to adjust the congestion window or data transmission rate in accordance with an embodiment of the present invention.

FIG. 8A illustrates an exemplary state model that may be used to adjust the congestion window or data transmission rate in accordance with an embodiment of the present invention. The state model illustrated in FIG. 8A may be employed to update the congestion window while the traffic management process is operating in a congestion avoidance state, including, for example, in steps 714 or 724 of the congestion avoidance state 704 from the embodiment of FIG. 7. In typical TCP implementations, a traffic management process may assume that certain measurements of network conditions are accurately and promptly reflected in variables maintained within the corresponding system. Under certain circumstances, however, this assumption may be incorrect. For example, in step 624 of slow start state 604 from FIG. 6B, a decision is made based on the size of the congestion window and measurements of the round trip time. Under certain circumstances, it may take at least one round trip time for measured round trip times to be reflected in updated values of the congestion window, so the two conditions evaluated within step 624 may not be synchronized in time. According to an embodiment of the present invention, the state model illustrated in FIG. 8A may be used to update the congestion window while allowing sufficient settling time for accurate measurements of round trip time.

In the embodiment of FIG. 8A, the data traffic management process transitions between four different states denoted as state 1 (802), state 2 (804), state −1 (806) and state 0 (808). Transitions between the four states are guided by measurements of channel or network resource availability. These measurements are illustrated in FIG. 8A by the value of a function "update," which may take a value of 0 or 1 depending on whether network congestion is detected: update=0 indicates that no traffic congestion has been detected, and condition update=1, which indicates that traffic congestion has been detected in the network. Transitions between the various states in the embodiment of FIG. 8A are accompanied by increases or decreases in the size of the congestion window maintained by the traffic management process, suggestively indicated as "increase" or "decrease."

Figure 8B:
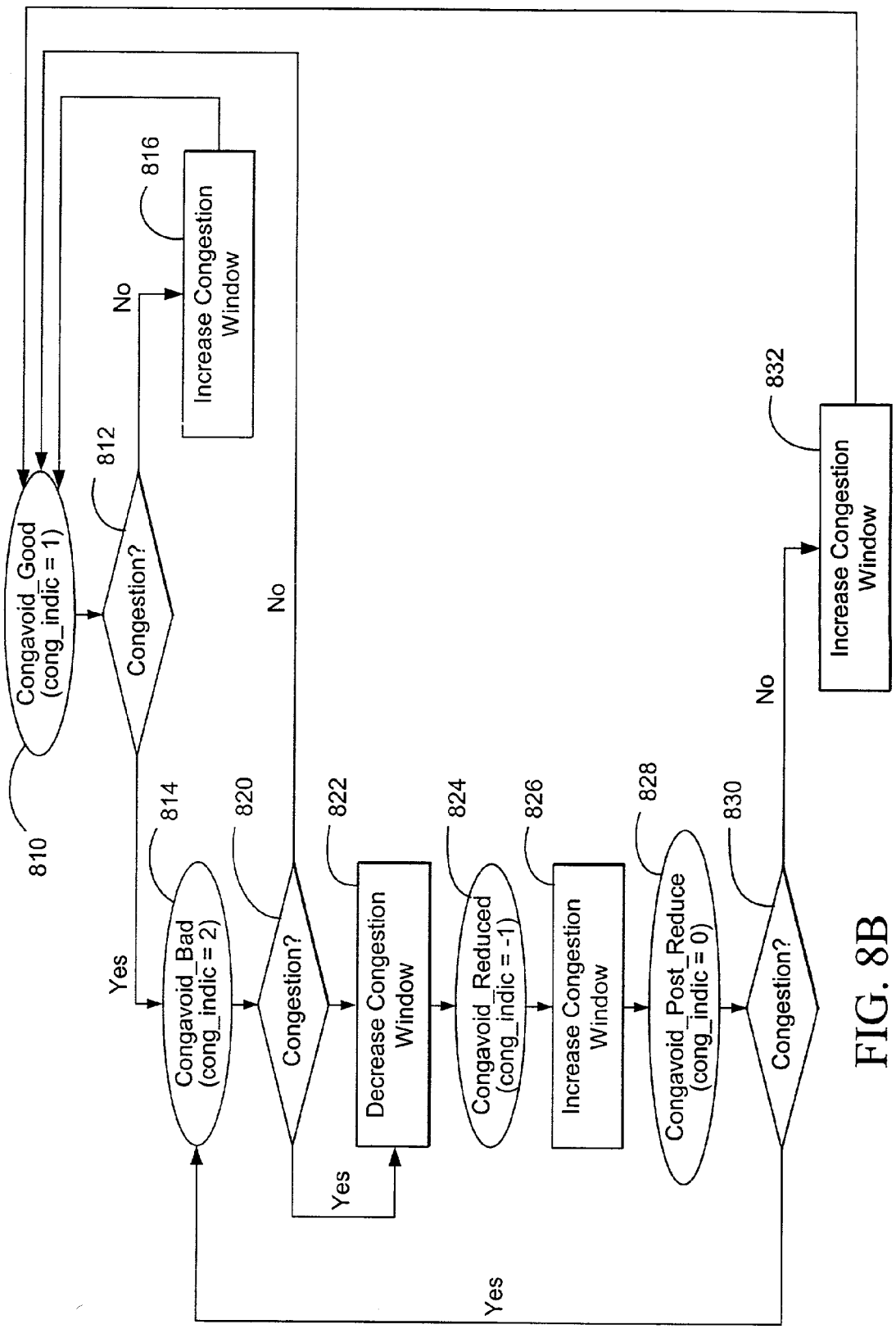
FIG. 8B illustrates a flow diagram showing exemplary state transitions corresponding to the exemplary state model from FIG. 8A.

FIG. 8B illustrates a flow diagram showing exemplary state transitions corresponding to the exemplary state model from FIG. 8A. The progression of the traffic management process through the states of FIG. 8A may also be described in reference to the state flow diagram of FIG. 8B. For example, the four states illustrated in FIG. 8B may correspond to the four states from FIG. 8A as follows: state CONGAVOID_GOOD (810) in FIG. 8B may correspond to state 1 (802) in FIG. 8A; state CONGAVOID_BAD (814) in FIG. 8B may correspond to state 2 (804) in FIG. 8A; state CONGAVOID_REDUCED (824) in FIG. 8B may correspond to state −1 (806) in FIG. 8A; and state CONGAVOID_POST_REDUCE (828) in FIG. 8B may correspond to state 0 (808) in FIG. 8A. In the embodiment of FIG. 8B, the traffic management process may begin initially in state CONGAVOID_GOOD (810). The management process then progresses to step 812, where the network is probed to determine traffic conditions. Determination of traffic conditions in step 812 is made by running an external process that employs a number of network or channel capacity measurements to assess availability of transmission resources. In the embodiment of FIG. 8A, this external process identifies network traffic congestion. The functionality and operation of the external process used to determine traffic congestion in step 812 is further described below in connection with the embodiment of FIG. 8C.

If no congestion is detected in step 812, the traffic management process increases the congestion window in step 816 and returns to state CONGAVOID_GOOD (810). In the embodiment of FIG. 8B, the congestion window is increased or decreased by one data packet at a time. In another embodiment, the congestion window may be increased by more than one packet. If congestion is detected in step 812, the traffic management process enters state CONGAVOID_BAD (814). The traffic management process then proceeds to state 820 where another decision regarding the existence of congestion in the network is made using a process substantially similar with the process previously described in conjunction with step 812. If no congestion is detected in step 820, then the traffic management process returns to state CONGAVOID_GOOD (810). Otherwise, if congestion is detected in step 820, the traffic management process decreases the congestion window in step 822 and enters state CONGAVOID_REDUCED (824).

State CONGAVOID_REDUCED (824) is a transient state that immediately follows a reduction in the size of the congestion window. Once in this state, the traffic management process attempts to increase the data transmission rate by increasing the congestion window in step 826, and therefore decreasing the period of the transmit timer. This may be done to maximize throughput and efficiently utilize network resources. From step 826, the traffic management process enters state CONGAVOID_POST_REDUCE (828), which is an intermediate state followed by another probing for network traffic conditions in step 830. The decision made in step 830 regarding the existence of network traffic congestion relies on a process substantially similar with the processes used for similar purposes in steps 812 and 820. If congestion is identified in step 830, the traffic management process returns to state CONGAVOID_BAD (814) in anticipation of a possible need to decrease the congestion window. If no congestion is determined in step 830, the traffic management process assumes that additional network transmission capacity exists, and increases the congestion window in step 832 to take advantage of this additional capacity. The traffic management process then returns to state CONGAVOID_GOOD (810).

Figure 8C:
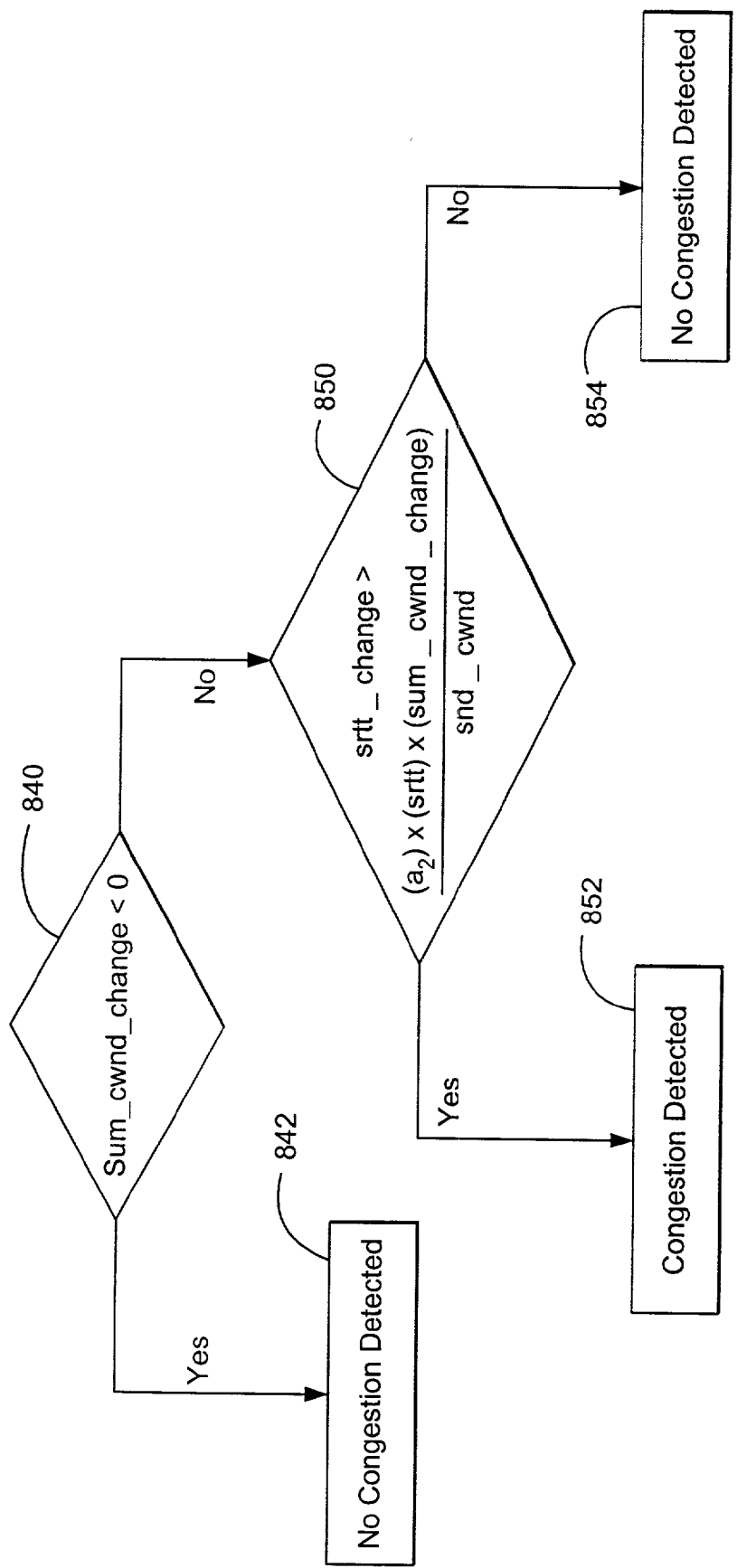
FIG. 8C illustrates an exemplary process that may be employed to detect network traffic congestion in accordance with an embodiment of the present invention.

FIG. 8C illustrates an exemplary process that may be employed to detect network traffic congestion in accordance with an embodiment of the present invention. The process illustrated in FIG. 8C may represent the external process employed in steps 812, 820 or 830 of the embodiment of FIG. 8B to determine network traffic congestion. According to the embodiment of FIG. 8C, determination of network traffic congestion is made using host-level statistics that take into account various individual connections that share a communication channel, therefore preventing destructive competition for channel resources among these individual connections. An advantage of this embodiment is that the global data throughput across individual connections is increased.

According to an aspect of the present invention, determination of network traffic congestion is made based on a number of traffic-related measurements, including the round trip time (which provides a measure of the propagation delay within the network) and the congestion windows for various active connections. In the embodiment of FIG. 8C, determination of network congestion is made in two stages. In a first stage, a decision whether variable sum_cwnd_change is less than zero is made in step 840. The variable sum_cwnd_change represents the change in the sum of the congestion windows for all active connections and provides a measure of the total amount of data sent by all connections and of the transmission rate over the channel shared by these active connections. If the condition in step 840 is true, therefore indicating that the sum of all congestion windows has not increased, an embodiment of the invention declares in step 842 that no congestion has been detected. One reason for declaring that no congestion exists when the sum of the congestion windows decreases is that such a decrease suggests that additional traffic capacity may have become available in the network, and therefore probing for network congestion may not be necessary.

If the condition in step 840 evaluates is false, however, the traffic management process proceeds to a second decision stage in step 850, where another evaluation regarding the existence of congestion in the network is made based on the following equation:

$$srtt\_change > a_2 \cdot srtt * sum\_cwnd\_change / snd\_cwnd. \quad (5)$$

In equation (5), srtt represents the smoothed estimate of the round trip time. The smoothed estimate of the round trip time may be determined substantially as previously described in connection with equation (1) and the embodiment of FIG. 6A. Variable srtt_change represents the change in the smoothed estimate of the round trip time since the last update. In another embodiment, the change in the smoothed estimate of the round trip time may be determined over a longer period of time. Scaling constant $a_2$ represents a constant used in congestion detection that may have been initialized in step 530 of initialization state 504 with a value between 0 and 1. In a particular embodiment, when the network exhibits a significant amount of traffic imbalance, variable $a_2$ is assigned a numerical value of 1. Variable snd_cwnd represents the congestion window for a particular connection under consideration.

In the embodiment of FIG. 8C, when the condition expressed in equation (5) is true, the traffic management process advances to step 852 and declares that network congestion has been detected. Conversely, if the condition evaluates as false, the traffic management process progresses to step 854 where it declares that no network congestion exists.

Figure 9:
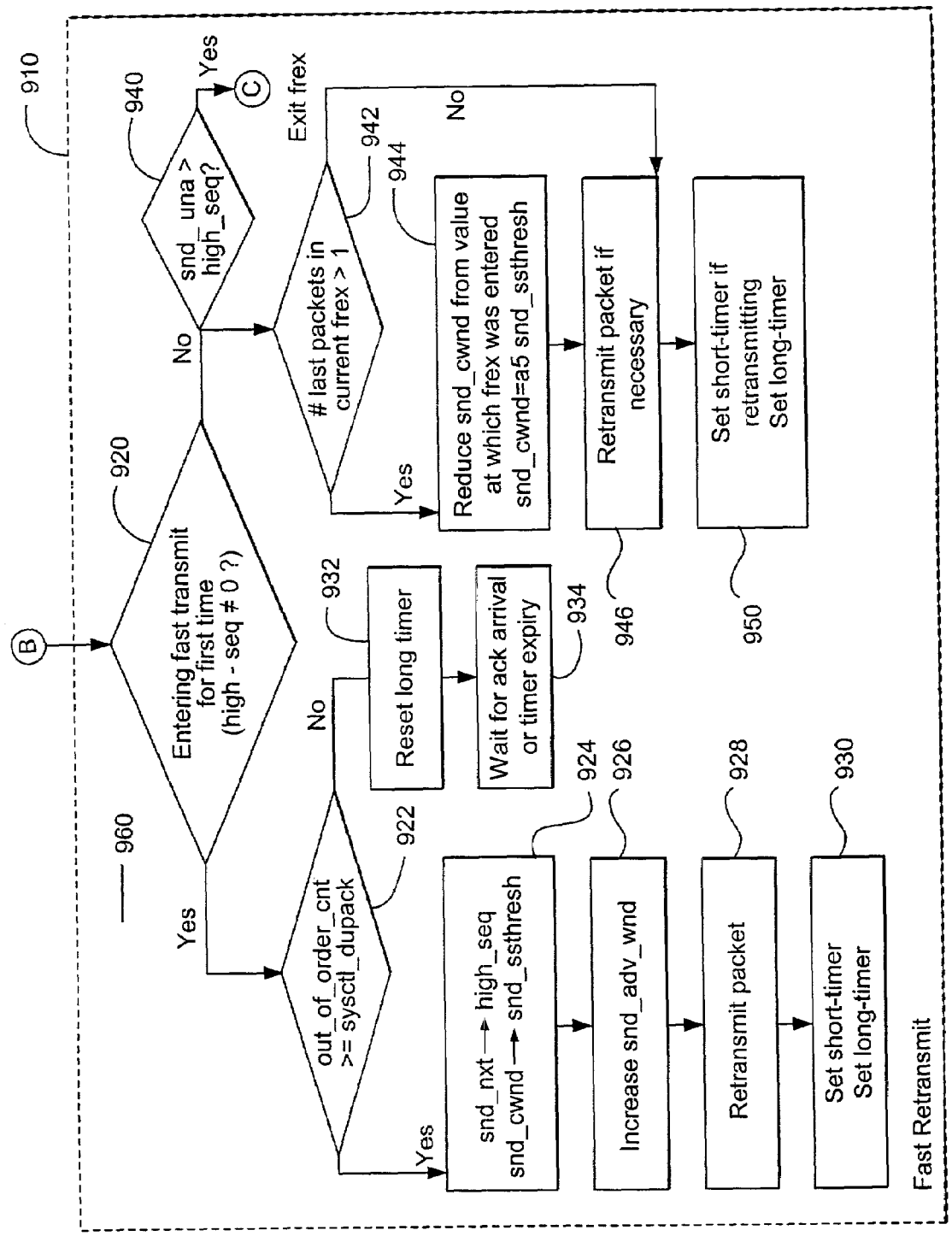
FIG. 9 illustrates a flowchart showing exemplary processes that may take place during a fast retransmit state in accordance with an embodiment of the present invention.

FIG. 9 illustrates a flowchart showing exemplary processes that may take place during a fast retransmit state in accordance with an embodiment of the present invention. Fast retransmit state 910 illustrated in FIG. 9 may correspond to the fast retransmit state 414 in the embodiment of FIG. 4. The traffic management process may enter the fast retransmit state 910 in step 666 of the process flow illustrated in FIG. 6C. In the fast retransmit state 910, data packets presumed to be lost along the transmission channel are retransmitted and the data transmission rate is adjusted gradually depending on channel resource availability. Further, a "sender advertised window" (alternatively identified as "flow control window" or "snd_adv_wnd") maintained by the client is employed to recover from data errors.

When first entering fast retransmit, the highest data packet sequence number sent thus far is stored in a variable high_seq. The system remains in fast retransmit state 910 and continues to retransmit lost packets until the transmitted packet sequence index number snd_una exceeds the value of high_seq, which indicates that the client has received all the packets that were resent. Upon entering the fast retransmit state 910, the traffic management process encounters decision step 920 that determines whether the fast retransmit state 910 is being entered for the first time in the current cycle. This condition essentially estimates the duration for which a corresponding connection between a server and a client has been operating in the fast retransmit state. If the fast retransmit state 910 is being entered for the first time in the current cycle, the traffic management process proceeds to step 922. In step 922, the number of data packets estimated to have been delivered to the receiver out of order, which is stored in a variable out_of_order_cnt, is compared to a threshold variable sysctl_dupack that indicates when the system should assume that data packages that have not been delivered within a certain period of time are lost. The decision in step 922 may be substantially similar with the decision made in step 664 from FIG. 6C, which was previously described in conjunction with the embodiment of FIG. 6C.

If the comparison in step 922 indicates that the number of data packets estimated to have been delivered to the receiver out of order exceeds the threshold value sysctl_dupack, the traffic management process enters step 924 where the highest sequence new packet number snd_nxt is stored in variable high_seq and the then-current size of the congestion window snd_cwnd is stored in the congestion window threshold snd_ssthresh. The sender advertised window is then increased in step 930. The sender advertised window ("snd_adv_wnd") indicates the amount of data that the sender may transmit. The sender advertised window may be used to match the amount of data transmitted by the server to the network transmission capacity to maximize throughput and efficiently recover from data errors. In one embodiment of the invention, the sender advertised window is used to limit the highest data packet sequence number that may be sent by the server to a value of $$snd\_una + snd\_adv\_wnd - 1,$$

where snd_una represents the sequence number of the next expected packet as indicated by the acknowledgment signals received from the client (i.e., all packets up to snd_una−1 are known to have been received).

In one embodiment of the present invention, the sender advertised window snd_adv_wnd is determined by selecting the maximum of two expressions in accordance with the following formula:

$$snd\_adv\_wnd = \text{Max}\{packets\_in\_flight + 3*sysctl\_dup\_ack/no\_active\_conn, snd\_cwnd\}, \quad (6)$$

where packets_in_flight represents an estimate of the number of data packets that have been sent by the server but have not yet reached the receiver, sysctl_dup_ac represents a threshold variable which may be configured to determine when the system should assume that data packages that have not been delivered within a certain period of time are lost, no_active_conn is the number of data connections to a single server or client sharing the communication channel and snd_cwnd represents the congestion window for a particular connection.

The traffic management process then advances to step 928 where it retransmits a data packet that is assumed to be lost. Retransmission of data packets in step 928 is performed using a transmit timer substantially as described in conjunction with the embodiment of FIG. 6A. The traffic management then sets a short timer and a long timer at step 930. Short and long timers have been previously described in connection with the embodiment of FIG. 6A. If the decision in step 922 evaluates as false, the system proceeds to step 932 where it resets a long timer. The system then enters state 934 where it waits for arrival of an acknowledgment signal or for expiration of the transmit timer, short timer, or long timer.

The preceding discussion relative to fast retransmit state 910 has described a series of steps that are executed when the decision in step 920 determines that fast retransmit state 920 was entered for the first time in the present cycle. If fast retransmit state 920 was not entered for the first time, however, step 940 is executed. In step 940, a decision is made whether snd_una is larger than high_seq. If so, then all packets were resent have been successfully received at the client, and the system leaves fast retransmit state 910 via branch point "C." Otherwise, if the decision in step 940 indicates that not all data packets have been acknowledged as received, the system proceeds to step 942. In step 942, a decision is made whether more than two packets have been lost and need to be retransmitted. If so, then the congestion window snd_cwnd is reduced in step 944 from the value it had upon entering the fast retransmit state 910 as follows:

$$snd\_cwnd = a_5 * snd\_ssthresh,$$

where $a_5$ is a constant that determines the extent to which the transmission rate is decreased during the fast retransmit state and which may have been initialized in step 530 of the initialization phase 504 from FIG. 5. The system then proceeds to step 946.

If the decision in step 942 evaluates as false, then the system skips step 944 and advances directly to step 946. At step 946, the system updates relevant variables and transmits a data packet if appropriate. In one embodiment, transmission of a data packet at step 946 is not based on a transmit timer as previously described in connection with various aspects of the present invention, but instead relies on substantially-typical TCP logic. If a data packet was retransmitted in step 948, the system sets a short timer and a long timer in step 950. Short timers and long timers have been previously described in connection with the embodiment of FIG. 6A.

According to one aspect of the present invention, early congestion detection permits use of a less drastic cutback in the data transmission rate upon detection of data loss than in typical TCP implementations. Such early congestion detection may be achieved through use of various aspects of the present invention disclosed herein. Consequently, when a data loss is detected, it is likely that the data loss is not due to traffic congestion, but it is instead a result of other phenomena affecting the network or the communication channel, like, for example, random signal fades in wireless transmissions.

One embodiment of the invention takes advantage of this fact by reducing the congestion window, and therefore indirectly the transmission rate, only when a second data packet loss is detected. By not reacting upon detection of a first data loss, this embodiment avoids premature reaction to apparent, but possibly non-existent, network congestion. This is in contrast to TCP, which generally reacts upon detection of losses by immediately reducing the congestion window and transmission rate. This mechanism of delayed reaction to data losses may be implemented with the assistance of the embodiment of FIG. 9. If the system determines that the packet that was presumed lost and was previously retransmitted was not the first lost packet, then the congestion window is decreased. This process ensures that the congestion window is only decreased if a second data loss is detected, but not before. In alternative embodiments, the decrease of the congestion window may occur only upon detection of a higher number of data losses than two. Depending on the nature the data being transmitted and the attributes of the network or communication channels, the number of data losses that induce a decrease in the congestion window, and correspondingly transmission rate, may be defined to be higher.

According to an aspect of the present invention, the data transmission rate may be adjusted independently of the size of the corresponding sender advertised window to separate congestion control from flow control within the traffic management process. In accordance with certain aspects of the invention, flow control may be performed by adjusting a congestion window to permit more aggressive probing of communication channel resources, or by using a timer to control the transmission rate to provide robustness to loss of control signals, as previously discussed. Since adjustment of the transmission rate may be performed based on the size of the congestion window and on the round trip time between the client and the server, as described in conjunction with the embodiment of FIG. 6A, congestion control depends primarily on congestion window and round trip time in related implementations.

As described in conjunction with the embodiment of FIG. 9, error recovery, which is a component of flow control, depends on the size of the advertised window. As can be ascertained from equation 6, in the embodiment of FIG. 9, the sender advertised window is at least as large as the congestion window. The size of the sender advertised window may be increased further while the congestion window may be decreased. As a result, flow congestion may be decoupled from flow control. Consequently, a congestion window or a timer may be used during error recovery to adjust the transmission rate while controlling congestion, while the sender advertised window may be independently adjusted to ensure efficient error recovery. In a particular embodiment, the congestion window may be reduced in response to congestion and data loss while the sender advertised window may be increased to permit transmission of more data packets, therefore accelerating error recovery. This permits separation of congestion control and flow control, thereby increasing the flexibility and efficiency of the traffic management process and decreasing reaction latency. For example, even if the rate of transmission is decreased upon detection of network congestion, the system may continue to transmit data packets. As a result, the short timer and long timer are repeatedly reset, which prevents the occurrence of a timeout that may lead to a significant reduction in the data transfer rate.

Figure 10:
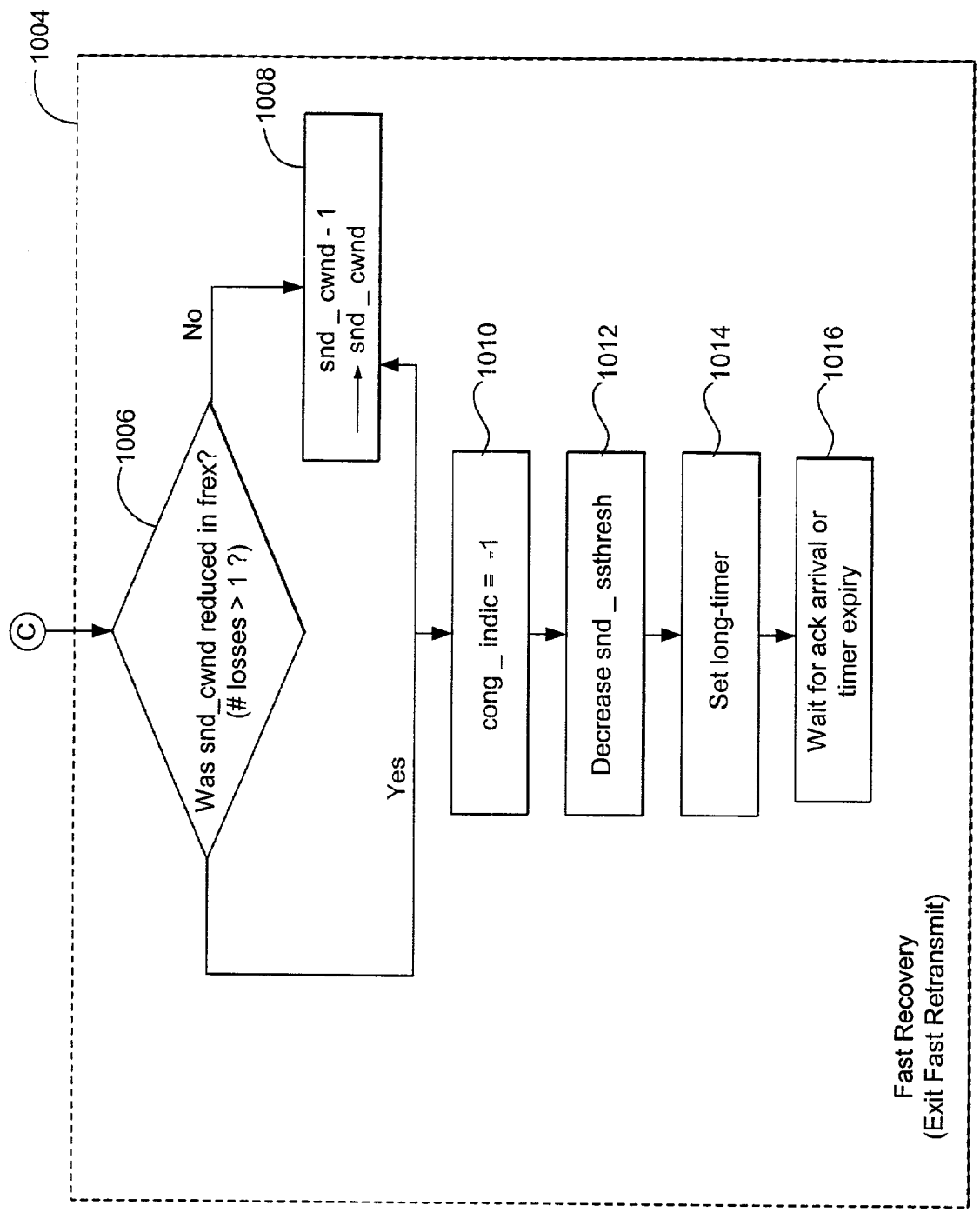
FIG. 10 illustrates a flowchart showing exemplary processes that may take place during a fast recovery state in accordance with an embodiment of the present invention.

FIG. 10 illustrates a flowchart showing exemplary processes that may take place during a fast recovery state in accordance with an embodiment of the present invention. Fast recovery state 1004 illustrated in FIG. 10 may correspond to fast recovery state 418 in the embodiment of FIG. 4. In fast recovery state 1004, the data transmission rate is gradually adjusted depending on channel resource availability. Fast recovery state 1004 tends to be a transitory state. In the embodiment of FIG. 10, the traffic management process enters fast recovery state 1004 from fast retransmit state 910 in FIG. 9 via branch point "D". In decision step 1006, a determination is made whether the congestion window was decreased while the traffic management process operated in fast retransmit state 910 of FIG. 9. If the congestion window was decreased, then the traffic management process proceeds to step 1010 where it configures a variable corresponding to a particular state in a state management model that updates the congestion window. In one embodiment, step 1010 configures a state variable corresponding to the state model previously described in connection with FIGS. 8A and 8B. As particularly illustrated in FIG. 1010, the traffic management process drives the state model into state CONGAVOID_REDUCED, which corresponds to state 806 in FIG. 8A and state 824 in FIG. 8B.

If the congestion window was not decreased in fast retransmit state 1002, however, the traffic management process first reduces the congestion window in step 1008 before updating the state variable in step 1010. From step 1010, the traffic management process then proceeds to step 1012, where it decreases the value of the congestion window threshold snd_ssthresh. In one embodiment, the congestion window threshold is decreased by a factor of ¾. The traffic management process then sets a long timer in step 1014. The traffic management process then enters step 1016 where it waits for arrival of an acknowledgment signal or for the expiration of a timer.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method of transferring data from a sender to a receiver in a communication network, the method comprising:
   establishing a connection between the sender and the receiver;
   measuring round trip times of data packets sent from the sender to the receiver;
   determining a congestion window parameter that specifies a maximum number of unacknowledged data packets that may be sent to the receiver; and
   transmitting additional data packets to the receiver in response to expiration of a transmit timer, the period of the transmit timer based on the round trip time measurements and the congestion window parameter.

2. The method of claim 1, wherein the step of measuring the round trip times comprises measuring the time between transmission of a data packet and receipt of a corresponding acknowledgement.

3. The method of claim 1, wherein the step of determining comprises adjusting the congestion window parameter in response to receipt of acknowledgements from the receiver.

4. The method of claim 3, wherein the step of adjusting comprises incrementing the congestion window parameter in response to receipt of each acknowledgement.

5. The method of claim 3, wherein the step of adjusting comprises incrementing the congestion window parameter in response to receipt of a number of acknowledgments equal to the size of the then-current congestion window parameter.

6. The method of claim 3, wherein the step of adjusting comprising increasing the congestion window parameter by an amount equal to a number of buffers effectively freed by each acknowledgement.

7. The method of claim 1, wherein the period of the timer is based on a smoothed round trip time and a smoothed congestion window.

8. The method of claim 7, wherein the period of the timer is based on a ratio of the smoothed round trip time and the smoothed congestion window.

9. The method of claim 7, wherein the smoothed round trip time is based on an average and mean deviation of a plurality of round trip time measurements.

10. The method of claim 7, wherein the smooth round trip time is based on a weighted sum of a previous smoothed round trip time and a then-current round trip time measurement.

11. The method of claim 7, wherein the smoothed congestion window comprises a weighted sum of a previous smoothed congestion window and a then-current congestion window parameter.

12. The method of claim 1, wherein the step of transmitting comprises multiplexing new and retransmitted data packets.

13. The method of claim 12, wherein the step of multiplexing comprises determining whether to transmit either the new or the retransmitted data packets based on expiration of a timer.

14. The method of claim 12, wherein the step of multiplexing comprises determining whether to transmit either the new or the retransmitted data packets based on a number of duplicate acknowledgments exceeding a predetermined threshold.

15. A system for transferring data from a sender to a receiver in a communication network, the system comprising:
   a processor; and
   a memory unit operably coupled to the processor, the memory unit storing instructions which when executed by the processor cause the processor to operate so as to:
   establish a connection between the sender and the receiver;
   measure round trip times of data packets sent from the sender to the receiver;
   determine a congestion window parameter that specifies a maximum number of unacknowledged data packets that may be sent to the receiver; and
   transmit additional data packets to the receiver in response to expiration of a transmit timer, the period of the transmit timer based on the round trip time measurements and the congestion window parameter.

* * * * *